US009014059B2

(12) United States Patent
Richardson et al.

(10) Patent No.: US 9,014,059 B2
(45) Date of Patent: Apr. 21, 2015

(54) QUALITY OF SERVICE SETUP ON A TIME RESERVATION BASIS

(75) Inventors: John William Richardson, Hamilton, NJ (US); Jens Cahnbley, Princeton Junction, NJ (US); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1391 days.

(21) Appl. No.: 10/499,923

(22) PCT Filed: Dec. 11, 2002

(86) PCT No.: PCT/US02/39528
§ 371 (c)(1),
(2), (4) Date: Aug. 9, 2005

(87) PCT Pub. No.: WO03/052993
PCT Pub. Date: Jun. 26, 2003

(65) Prior Publication Data
US 2006/0038877 A1  Feb. 23, 2006

Related U.S. Application Data

(60) Provisional application No. 60/341,671, filed on Dec. 15, 2001.

(51) Int. Cl.
*H04L 12/16* (2006.01)
*G06F 15/16* (2006.01)
(Continued)

(52) U.S. Cl.
CPC ...... *H04L 65/1006* (2013.01); *H04L 29/06027* (2013.01); *H04N 7/15* (2013.01); *H04L 65/403* (2013.01); *H04L 65/80* (2013.01); *H04L 65/4038* (2013.01)

(58) Field of Classification Search
CPC ............... H04L 29/06027; H04L 65/4038; H04L 65/80; H04L 65/403; H04L 65/1006; H04N 7/15
USPC ............ 370/230, 231, 235, 260, 261, 395.21, 370/395.4, 395.41, 395.43, 468, 443, 229, 370/389, 395.2, 395.42; 709/226, 227, 204
See application file for complete search history.

(56) References Cited

U.S. PATENT DOCUMENTS 5,347,511 A * 9/1994 Gun .............................. 370/255
5,995,490 A 11/1999 Shaffer et al.
(Continued)

FOREIGN PATENT DOCUMENTS

EP 0797331 A2 9/1997
EP 1014651 A2 6/2000
(Continued)

OTHER PUBLICATIONS

Tekelec with permission McGraw-Hill Telecommunications from the book Telecommunications Protocol, Travis Russell, 1997, pp. 149-155 www.telelec.com/ss7/protocols/ip.*
(Continued)

*Primary Examiner* — Sonia Gay
(74) *Attorney, Agent, or Firm* — Robert D. Shedd

(57) ABSTRACT

In a network having routing elements for routing information through the network, there is provided a method for providing an ability to set up a Quality of Service contract for a videoconference session between clients. A reservation is received for a time period for the videoconference session. Configuration information, for filtering real-time traffic corresponding to the videoconference session from other traffic traversing the network, is sent to at least one of the routing elements after the time period is reserved.

39 Claims, 20 Drawing Sheets

(51) Int. Cl.
*H04L 29/06* (2006.01)
*H04N 7/15* (2006.01)

(56) References Cited

U.S. PATENT DOCUMENTS

| | | | |
|---|---|---|---|
| 5,995,503 | A | 11/1999 | Crawley et al. |
| 6,034,964 | A * | 3/2000 | Fukushima et al. .......... 370/401 |
| 6,195,117 | B1 | 2/2001 | Miyazaki |
| 6,275,493 | B1 | 8/2001 | Morris et al. |
| 6,353,616 | B1 * | 3/2002 | Elwalid et al. ................ 370/443 |
| 6,466,252 | B1 | 10/2002 | Miyazaki |
| 6,765,872 | B1 * | 7/2004 | Tazaki .......................... 370/235 |
| 6,771,661 | B1 * | 8/2004 | Chawla et al. ................ 370/468 |
| 7,035,230 | B1 * | 4/2006 | Shaffer et al. ................ 370/261 |
| 7,065,042 | B1 * | 6/2006 | Pan et al. ...................... 370/229 |
| 7,225,271 | B1 * | 5/2007 | DiBiasio et al. ............. 709/240 |
| 2002/0087699 | A1 * | 7/2002 | Karagiannis et al. ......... 709/227 |
| 2002/0103864 | A1 * | 8/2002 | Rodman et al. ............... 709/204 |

FOREIGN PATENT DOCUMENTS

| | | |
|---|---|---|
| EP | 1107509 A2 | 6/2001 |
| EP | 1 156 629 A1 | 11/2001 |
| FR | 2799326 | 4/2001 |
| JP | 8-242435 | 9/1996 |
| JP | 10032652 | 2/1998 |
| JP | 10322392 | 12/1998 |
| JP | 11027283 | 1/1999 |
| JP | 2000004244 | 1/2000 |
| JP | 2000134213 | 5/2000 |
| JP | 2000-253053 | 9/2000 |
| WO | WO 98/58474 | 12/1998 |

OTHER PUBLICATIONS

"Latest Conferencing Products and Services", Communication News, Mar. 2000, Retreived from the Internet, URL: Http://www.findarticles.com/cf 0/mOCMN/3 37/60498444/print.ihtml.

C. Oliveira; J.B. Kim, T. Suda "An Adaptive Bandwidth Reservation Scheme for High-Speed Multimedia Wireless Networks", IEEE Journal on Selected Areas in Communications, Aug. 1999, vol. 16, No. 6, pp. 858-874. Retrieved from: Dialog Information Services, Palo Alto, CA USA, Dialog Accession No. 06993037.

Search Report Dated Jan. 29, 2003.

(Supplementary European Search Report Attached dated: Dec. 3, 2009).

Yokotani et al., "Proposals of Signaling Procedures and Resource Management in ATM Networks for Advance Resource Reservation", The Institute of Electronics, Informaion and Communication Engineers, Technical Report of IEICE, May 1998.

* cited by examiner

| INFORMATION FIELD | INFORMATION |
|---|---|
| USERNAME | JOHN RICHARDSON |
| PASSWORD | THOMSON |
| SUPPORTED VIDEO CODECS | H.263 |
| SUPPORTED AUDIO CODECS | G.723   G.711 |
| SUPPORTED RESOLUTIONS | CIF   QCIF |
| IP ADDRESS | 157.254.122.23 |
| CURRENT CALL NUMBER | 0 (NONE) |
| AVAILABILITY | AVAILABLE |
| LOCATION | 1 |

FIG. 4

| INFORMATION FIELD | INFORMATION |
|---|---|
| CALL ID | 1 |
| DESCRIPTION | MEETING ABOUT VIDEOCONFERENCE PROJECT |
| MULTICAST SESSION | YES--MULTICAST ADDRESS (226.3.4.5) |
|  |  |
| PARTICIPANT 1 IP ADDRESS | 157.254.122.23--LOCATION (1) |
| TRANSMITTING RESOLUTION | CIF--(ACTIVE USER) |
| TRANSMITTING BITRATE | 256kbps--(ACTIVE USER) |
| VIDEO CODEC | H.263 |
| AUDIO CODEC | G.723 |
|  |  |
| PARTICIPANT 2 IP ADDRESS | 157.254.122.151--LOCATION (1) |
| TRANSMITTING RESOLUTION | QCIF--(PASSIVE USER) |
| TRANSMITTING BITRATE | 30kbps--(PASSIVE USER) |
| VIDEO CODEC | H.263 |
| AUDIO CODEC | G.723 |
|  |  |
| PARTICIPANT 2 IP ADDRESS | 157.254.96.99--LOCATION (2) |
| TRANSMITTING RESOLUTION | CIF--(ACTIVE USER) |
| TRANSMITTING BITRATE | 256kbps--(ACTIVE USER) |
| VIDEO CODEC | H.263 |
| AUDIO CODEC | G.723 |

FIG. 5

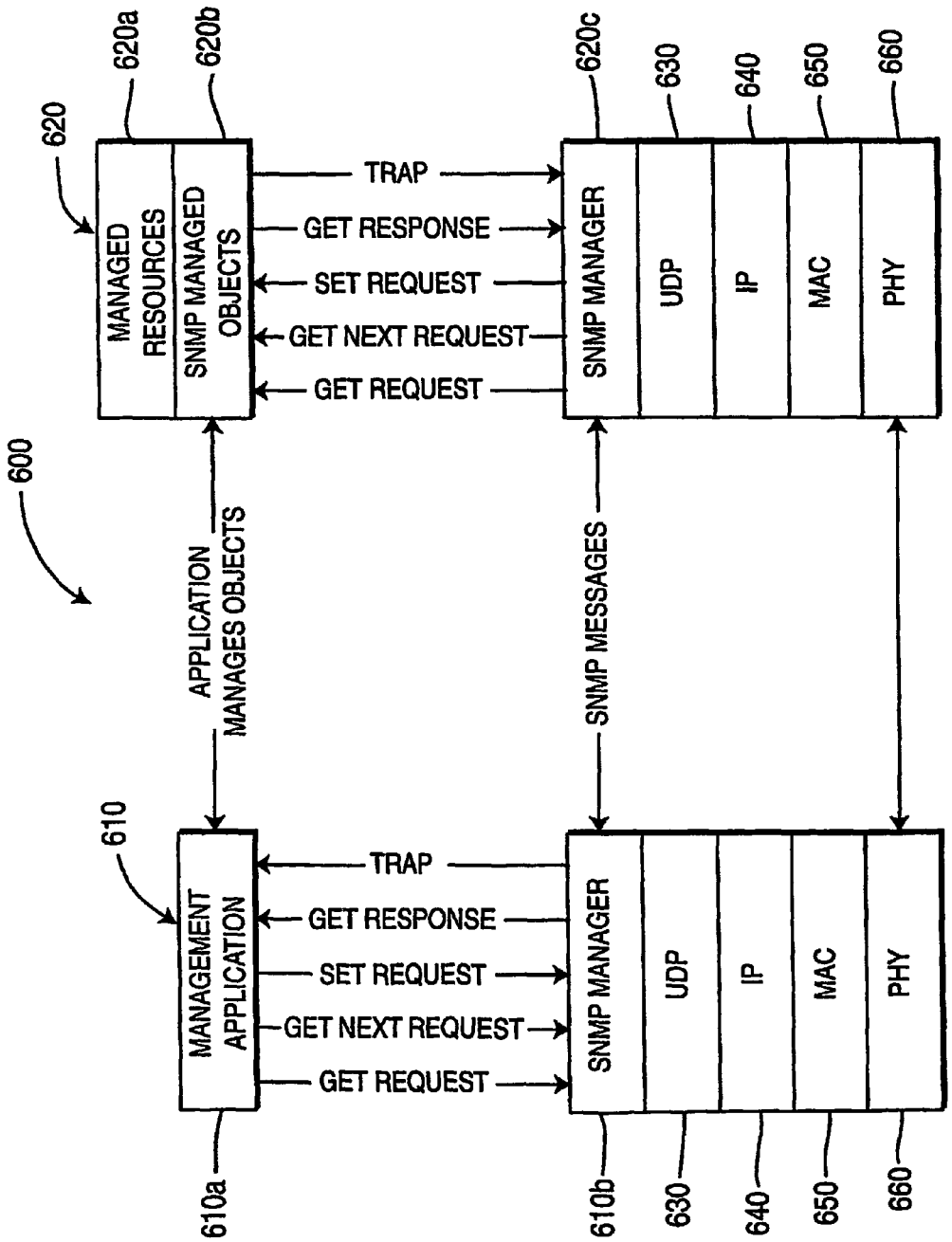

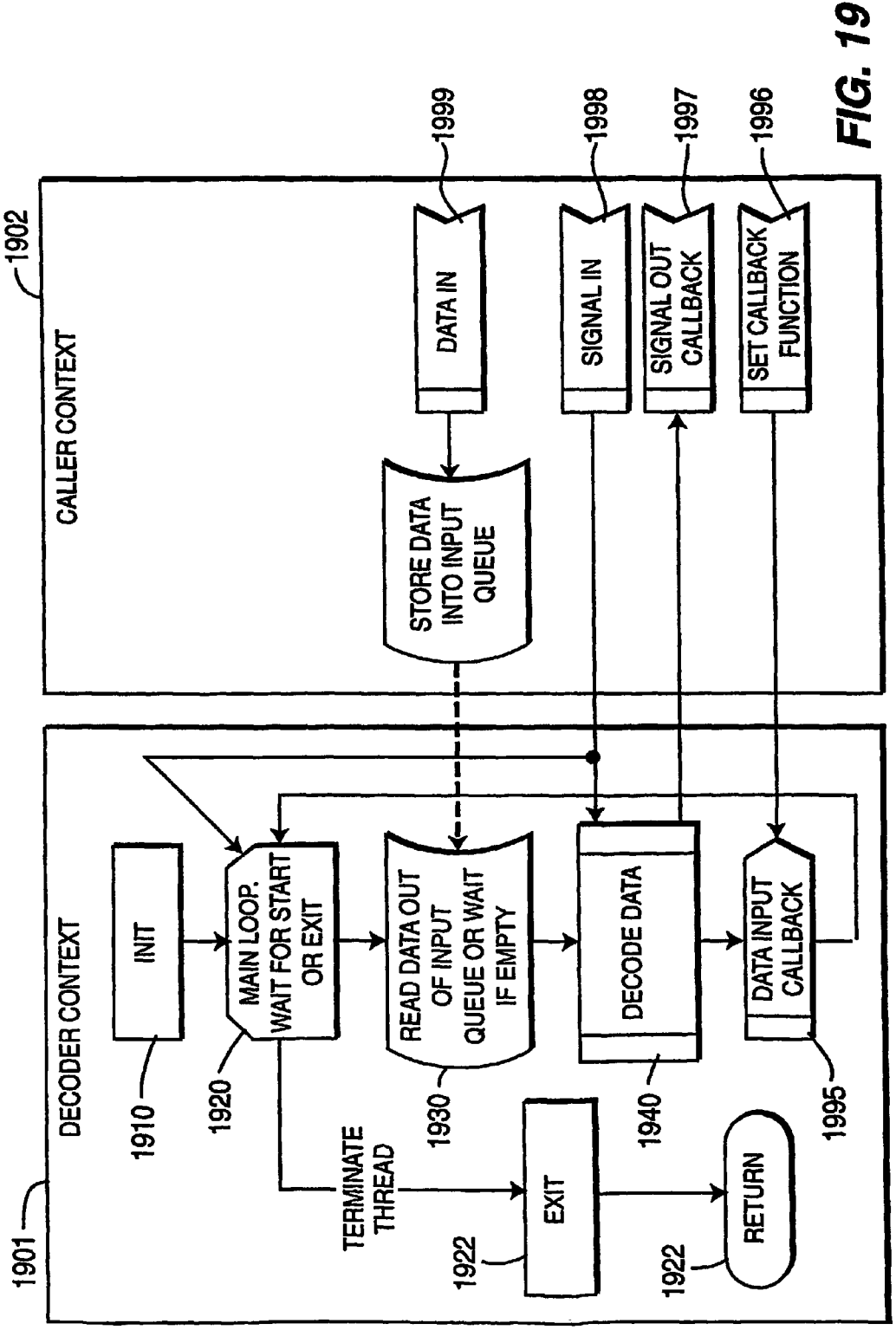

QUALITY OF SERVICE SETUP ON A TIME RESERVATION BASIS

CROSS-REFERENCE TO RELATED APPLICATIONS

This application claims the benefit, under 35 U.S.C. §365 of International Application PCT/US02/39528, filed Dec. 11, 2002, which was published in accordance with PCT Article 21(2) on Jun. 26, 2003 in English and which claims the benefit of. provisional patent application Ser. No. 60/341,671, entitled "QUALITY OF SERVICE SETUP ON A TIME RESERVATION BASIS", filed on 15 Dec. 2001.

FIELD OF THE INVENTION

The present invention generally relates to videoconferencing and, more particularly, to a method for setting up Quality of Service (QoS) contracts and traffic classification filters for videoconference sessions. The method employs time reservations in setting up the QoS contracts and the traffic classification filters. The traffic classification filters differentiate real-time traffic (videoconference traffic) from non-real-time traffic.

BACKGROUND OF THE INVENTION

Typically, videoconferencing is implemented over dedicated Integrated Services Digital Network (ISDN) and/or T1/T3 circuits. These circuits provide a dedicated path between two geographically separate locations. A drawback to such an arrangement is that dedicated circuits can be extremely expensive and underutilized. There is a lot of wasted bandwidth if the dedicated circuits are not being utilized because a videoconference session is not taking place. Many corporations that have geographically separate locations typically have dedicated circuits (e.g., T1 circuits) providing a data network between them. The dedicated circuits allow the Local Area Networks (LAN) of each location to be connected together creating a Wide Area Network (WAN). The primary use of these circuits is for data connectivity between the two locations.

The LANs at each location are connected locally by Ethernet switches. The LANs provide an infrastructure with large amounts of bandwidth. The typical connectivity bandwidth on a LAN is 100 Mbps (full-duplex). This typically translates into excess amounts of bandwidth available between the end nodes and the router that connects them to the WAN. There is almost always a bandwidth constraint on the WAN and never in the LAN, therefore, it is more important to provide a differentiation of the types of traffic (e.g., real-time traffic, such as videoconference traffic, versus non-real-time traffic) over the WAN interfaces. If prioritization of real-time traffic over non-real-time traffic does not take place, and the amount of information to be transferred across the WAN link is greater than the available bandwidth, then congestion will occur resulting in a non-selective dropping of packets. The LAN usually relies upon the excess amounts of bandwidth available to guarantee that congestion will not take place.

Accordingly, it would be desirable and highly advantageous to have way to provide a guaranteed amount of bandwidth for a videoconference session, so as to avoid undesirable effects such as, e.g., non-selective dropping of packets.

SUMMARY OF THE INVENTION

The problems stated above, as well as other related problems of the prior art, are solved by the present invention, using a method for setting up Quality of Service (QoS) contracts and traffic classification filters for videoconference sessions. The method employs time reservations in setting up the QoS contracts and the traffic classification filters. The traffic classification filters differentiate real-time traffic (videoconference traffic) from non-real-time traffic.

According to an aspect of the present invention, in a network having routing elements for routing information through the network, there is provided a method for providing an ability to set up a Quality of Service (QoS) contract for a videoconference session between clients. A reservation is received for a time period for the videoconference session. Configuration information, for filtering real-time traffic corresponding to the videoconference session from other traffic traversing the network, is sent to at least one of the routing elements after the time period is reserved.

According to another aspect of the present invention, in a network having routing elements for routing information through the network, there is provided a system for providing an ability to set up a Quality of Service (QoS) contract for a videoconference session between clients. The system includes means for receiving a reservation for a time period for the videoconference session. The system also includes means for sending configuration information, for filtering real-time traffic corresponding to the videoconference session from other traffic traversing the network, to at least one of the routing elements after the time period is reserved.

According to yet another aspect of the present invention, in a network having routing elements for routing information through the network, there is provided a method for providing an ability to set up a Quality of Service (QoS) contract for a videoconference session between clients. An ability is provided to send a reservation for the videoconference session. The reservation specifies a time period for the videoconference session so that a client may participate in the videoconference session with a guaranteed level of service during the specified time period.

These and other aspects, features and advantages of the present invention will become apparent from the following detailed description of preferred embodiments, which is to be read in connection with the accompanying drawings.

BRIEF DESCRIPTION OF THE DRAWINGS

FIG. 4 is a diagram illustrating a member database entry 400 for the member database 314 included in the database entity of FIG. 3, according to an illustrative embodiment of the present invention;

FIG. 5 is a block diagram illustrating an active session entry 500 for the active session database 312 included in the database entity 302 of FIG. 3, according to an illustrative embodiment of the present invention;

FIG. 6 is a block diagram illustrating a Simple Network Management Protocol (SNMP) client-server architecture 600, according to an illustrative embodiment of the present invention;

FIG. 19 is a diagram illustrating a method employed by a decoder 1890 included in either of the audio codecs 1804*a* and/or the video codecs 1804*b*, according to an illustrative embodiment of the present invention;

DETAILED DESCRIPTION OF THE INVENTION

The present invention is directed to a method for setting up Quality of Service (QoS) contracts and traffic classification filters for videoconference sessions. The method employs time reservations in setting up the QoS contracts and the traffic classification filters. The traffic classification filters differentiate real-time traffic (videoconference traffic) from non-real-time traffic.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1A:
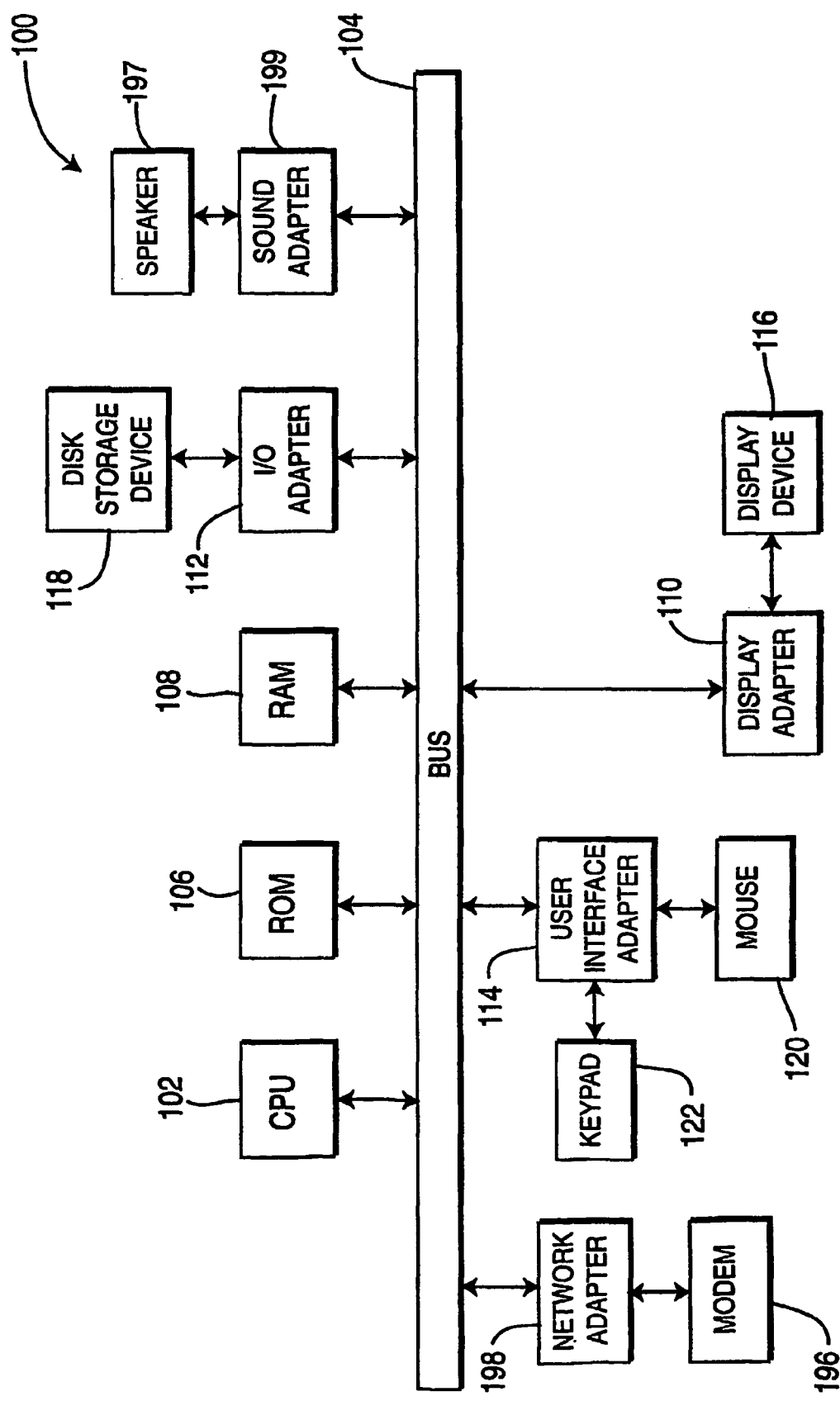
FIG. 1A is a block diagram illustrating a computer system 100 to which the present invention may be applied, according to an illustrative embodiment of the present invention.

FIG. 1A is a block diagram illustrating a computer system 100 to which the present invention may be applied, according to an illustrative embodiment of the present invention. The computer processing system 100 includes at least one processor (CPU) 102 operatively coupled to other components via a system bus 104. A read only memory (ROM) 106, a random access memory (RAM) 108, a display adapter 110, an I/O adapter 112, a user interface adapter 114, a sound adapter 199, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard 122 are operatively coupled to system bus 104 by user interface adapter 114. The mouse 120 and keyboard 122 are used to input and output information to and from system 100.

At least one speaker (herein after "speaker") 197 is operatively coupled to system bus 104 by sound adapter 199.

A (digital and/or analog) modem 196 is operatively coupled to system bus 104 by network adapter 198.

A description will now be given of policy based network management (PBNM), according to an illustrative embodiment of the present invention. PBNM is a technology that provides the ability to define and distribute policies to manage networks (an example network to which the present invention may be applied is described below with respect to FIG. 2). These policies allow the coordinated control of critical network resources such as bandwidth and security. PBNM enables applications, such as IP based videoconferencing, that require differentiated treatment on the network. PBMN provides the basis for allowing different types of applications to co-exist on a single network and provide the required resources to each of these applications.

In further detail, PBNM defines policies for applications and users that consume network resources. For example, business critical applications can be given the highest priority and a percentage of the bandwidth on the network, videoconferencing and voice over IP can be given the next highest priority, and finally web traffic and file transfers that do not have strict bandwidth or time critical constraints can be given the remaining amount of resources on the network. This differentiation of users and applications can be accomplished using PBNM.

The videoconference system ties into a PBNM system by querying a network policy server for the policy that corresponds to the videoconference application. The videoconference server obtains the policy from the network policy server and determines the resources available in the network for videoconferencing based on the received parameters. The policy will typically correspond to, for example, the bandwidth available to this application during certain times of the day or only to certain users. The configuration is readily modified by, for example, adding, deleting, replacing, modifying, etc., policies and/or portions thereof. As a result, the videoconference server will use the information provided in the policy to manage conferencing sessions on the network.

Figure 2:
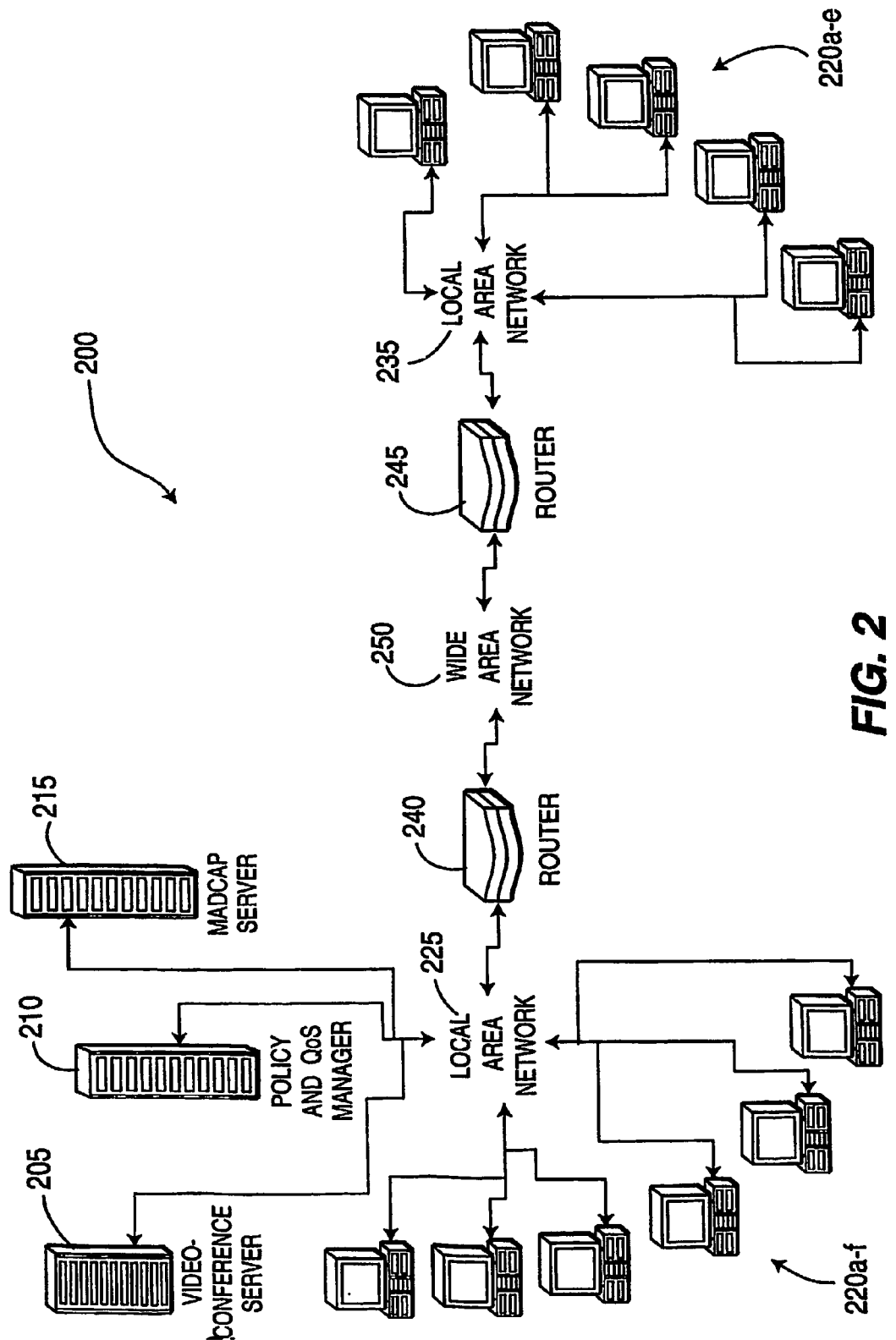
FIG. 2 is a block diagram illustrating a network 200 to which the present invention may be applied, according to an illustrative embodiment of the present invention.

FIG. 2 is a block diagram illustrating a network 200 to which the present invention may be applied, according to an illustrative embodiment of the present invention. The network 200 includes: a videoconference server 205; a policy and QoS manager 210; a MADCAP server 215; a first plurality of computer 220a-f; a first local area network 225; a first router 240; a second plurality of computers 230a-e; a second local area network 235; a second router 245; and a wide area network 250.

Figure 3:
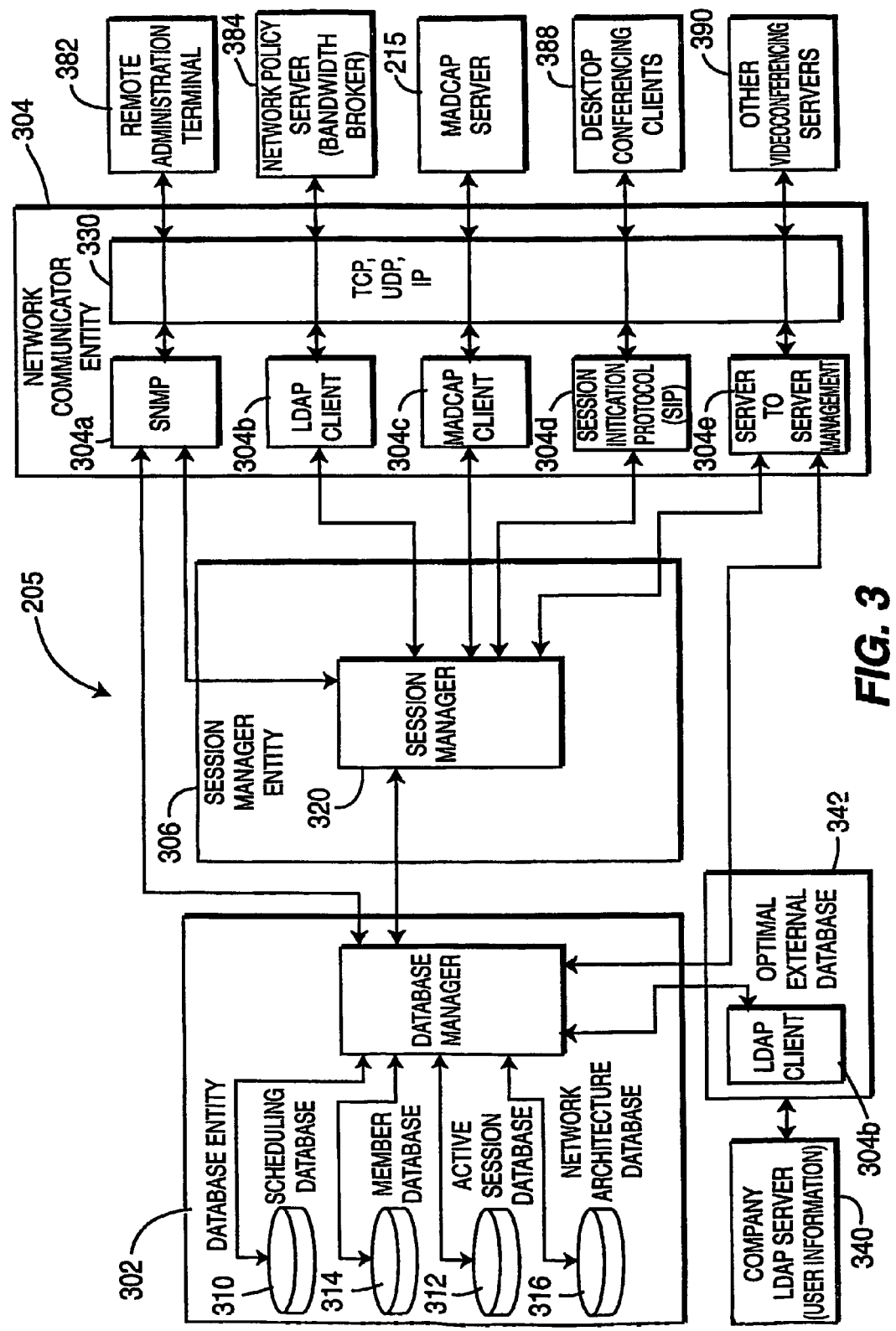
FIG. 3 is a block diagram illustrating the videoconference server 205 of FIG. 2, according to an illustrative embodiment of the present invention.

A description will now be given of a server architecture, according to an illustrative embodiment of the present invention. FIG. 3 is a block diagram illustrating the videoconference server 205 of FIG. 2, according to an illustrative embodiment of the present invention. The videoconference server 205 can be considered to include the following three basic entities: the database entity 302; the network communications entity 304; and the session management entity 306.

The session management entity 306 is responsible for managing videoconference session setup and teardown. The session management entity 306 also provides most of the main control for the videoconference server 205. The session management entity 306 includes a session manager 320 for implementing functions of the session management entity 306.

The network communications entity 304 is responsible for encapsulating the many different protocols used for the videoconference system. The protocols may include Simple Network Management Protocol (SNMP) for remote administration and management, Common Open Policy Services (COPS) or another protocol such as Lightweight Directory Access Protocol (LDAP) for policy management, Multicast Address Dynamic Client Allocation Protocol (MADCAP) for multicast address allocation, Session Initiation Protocol (SIP) for videoconference session management, and Server to Server messaging for distributed videoconferencing server management. Accordingly, the network communications entity 304 includes: an SNMP module 304a; an LDAP client module 304b; a MADCAP client module 304c; a SIP module 304d; and a server-to-server management module 304e. Moreover, the preceding elements 304a-e respectively communicate with the following elements: a remote administration terminal 382; a network policy server (bandwidth broker) 384; a MADCAP server 215; desktop conferencing clients 388; and other videoconferencing servers 390. Such communications may be implemented also using Transmission Control Protocol (TCP), User Datagram Protocol (UDP), Internet Protocol (IP), collectively represented by protocol module 330. It is to be appreciated that the preceding list of protocols and corresponding elements are merely illustrative and, thus, other protocols and corresponding elements may be readily employed while maintaining the spirit and scope of the present invention.

It is to be further appreciated that the architecture of the videoconference server 205 is also suitable for a user on a portable device to connect into the corporate infrastructure through a Virtual Private Network (VPN) in order to send and receive content from a videoconference session.

The database entity 302 includes the following four databases: a scheduling database 310, an active session database 312, a member database 314, and a network architecture database 316.

The videoconference system server 205 further includes or, at the least, interfaces with, a company LDAP server (user information) 340 and an optional external database 342. The optional external database 342 includes an LDAP client 304b.

A description will now be given of the member database 314 included in the database entity 302 of FIG. 3, according to an illustrative embodiment of the present invention. The member database 314 includes information on each user that has logged into the videoconference system. As an example, the following information may be kept in the member database 314 for each user: username; password (if applicable); supported video codecs and capture resolutions; supported audio codecs; current IP address; current call number (if currently a member of an active call); availability (available or unavailable); video camera type and model; location on the network (each location is connected by a limited bandwidth wide area network link); and CPU type and processing power. It is to be appreciated that the preceding items are merely illustrative and, thus, other items in addition to or in place of some or all of the preceding items may also be kept in the member database 314 for each user, while maintaining the spirit and scope of the present invention.

FIG. 4 is a diagram illustrating a member database entry 400 for the member database 314 included in the database entity 302 of FIG. 3, according to an illustrative embodiment of the present invention. In the illustrative embodiment of FIG. 4, the member database 314 is implemented using a simple linked list. However, it is to be appreciated that in other embodiments of the present invention, different implementations of the member database 314 may be employed while maintaining the spirit and scope of the present invention. As one example, an LDAP type of database may be used to store the member information.

A description will now be given of the active session database 312 included in the database entity 302 of FIG. 3, according to an illustrative embodiment of the present invention. The active session database 312 includes information on each videoconference session currently taking place. As an example, the following information may be kept for each call in the active session database 312: call ID; description; multicast (yes/no); if multicast, then multicast IP address; for each participant, network location, current transmitting resolution, current transmitting bit rate, video and audio codec; public/private call (can others join?); scheduled time of session; start time of session; and any additional options. It is to be appreciated that the preceding items are merely illustrative and, thus, other items in addition to or in place of some or all of the preceding items may also be kept in the active session database 312, while maintaining the spirit and scope of the present invention.

FIG. 5 is a block diagram illustrating an active session entry 500 in the active session database 312 included in the database entity 302 of FIG. 3, according to an illustrative embodiment of the present invention. In the illustrative embodiment of FIG. 5, the active session database 312 is implemented using a simple linked list. However, it is to be appreciated that in other embodiments of the present invention, different implementations of the active session database 312 may be employed while maintaining the spirit and scope of the present invention.

Referring again to FIG. 3, a description will now be given of the network architecture database 316 included in the database entity 302 of FIG. 3, according to an illustrative embodiment of the present invention. The network architecture database 316 includes a full mapping of the entire network. The network architecture database 316 includes information on each active network element (i.e., IP Routers, Ethernet switches, etc.) and information on links that connect the routers and switches together. To effectively manage the bandwidth and quality of service in the network, the videoconference server 205 needs to know this information.

Policy information concerning the number of videoconference sessions that are allowed to take place simultaneously, the videoconference session bit rates, and bandwidth limits can also be defined in the network architecture database 316. The network architecture could be represented as a weighted graph within the network architecture database 316. It is to be appreciated that the network architecture database 316 is an optional database in the videoconference server 205. The network architecture database 316 may be used to cache the policies that are requested from the policy server 210.

A description will now be given of the scheduling database 310 included in the database entity 302 of FIG. 3, according to an illustrative embodiment of the present invention. The scheduling database 310 contains a schedule for users to reserve times to use the videoconference system. This is dependent on the policies that, for example, an Information Systems department has in place concerning the number of videoconference sessions that can take place simultaneously on certain links over the wide area network 250.

A description will now be given of the network communications entity 304 of FIG. 3. The network communications entity 304 includes: a Simple Network Management Protocol (SNMP) module 304a; a Lightweight Directory Access Protocol (LDAP) client module 304b; a Multicast Address Dynamic Client Allocation Protocol (MADCAP) client module 304c; a Session Initiation Protocol (SIP) module 304d; and a server-to-server management module 304e.

A description will now be given of the Simple Network Management Protocol (SNMP) module 304a included in the network communication entity 304 of FIG. 3, according to an illustrative embodiment of the present invention. FIG. 6 is a block diagram illustrating a Simple Network Management Protocol (SNMP) client-server architecture 600, according to an illustrative embodiment of the present invention. The architecture 600 represents one implementation of the SNMP module 304a; however, it is to be appreciated that the present invention is not limited to the architecture shown in FIG. 6 and, thus, other SNMP architectures may also be employed while maintaining the spirit and scope of the present invention. SNMP will be used for remote administration and monitoring of the videoconferencing server.

The Simple Network Management Protocol (SNMP) client-server architecture 600 includes an SNMP management station 610 and an SNMP managed entity 620. The SNMP management station 610 includes a management application 610a and an SNMP manager 610b. The SNMP managed entity 620 includes managed resources 620a, SNMP managed objects 620b, and an SNMP agent 620c. Moreover, each of the SNMP management station 610 and an SNMP managed entity 620 further include a UDP layer 630, an IP layer 640, a Medium Access Control (MAC) layer 650, and a physical layer 660.

The SNMP agent 620c allows monitoring and administration from the SNMP management station 610. The SNMP agent 620c is the client in the SNMP architecture 600. The SNMP agent 620c basically takes the role of responding to requests for information and actions from the SNMP management station 610. The SNMP management station 610 is the server in the SNMP architecture 600. The SNMP management station 610 is the central entity that manages the agents in a network. The SNMP management station 610 serves the function of allowing an administrator to gather statistics from the SNMP agent 620c and change configuration parameters of the SNMP agent 620c.

Using the SNMP model, the resources in the videoconference server 205 can be managed by representing these resources as objects. Each object is a data variable that represents one aspect of the managed agent. This collection of objects is commonly referred to as a Management Information Base (MIB). The MIB functions as a collection of access points at the SNMP agent 620c for the SNMP management station 610. The SNMP management station 610 is able to perform monitoring by retrieving the value of MIB objects in the SNMP agent 620c. The SNMP management station 610 is also able to cause an action to take place at the SNMP agent 620c or can change the configuration settings at the SNMP agent 620c.

SNMP operates over the IP layer 640 and uses the UDP layer 630 for its transport protocol.

The basic messages used in the SNMP management protocol are as follows: GET; SET; and TRAP. The GET message enables the SNMP management station 610 to retrieve the value of objects at the SNMP agent 620c. The SET message enables the SNMP management station 610 to set the value of objects at the SNMP agent 620c. The TRAP message enables the SNMP agent 620c to notify the SNMP management station 610 of a significant event.

A description will now be given of the SNMP managed resources 620a included in the SNMP managed entity 620, according to an illustrative embodiment of the present invention. The remote administration could monitor and/or control the following resources within the videoconference server 205: active sessions and associated statistics; session log; network policy for videoconferencing; Session Initiation Protocol (SIP) parameters and statistics; and MADCAP parameters and statistics.

From the SNMP management station 610, the following three types of SNMP messages are issued on behalf of a management application: GetRequest; GetNextRequest; and SetRequest. The first two are variations of the GET function. All three messages are acknowledged by the SNMP agent 620c in the form of a GetResponse message, which is passed up to the management application 610a. The SNMP agent 620c may also issue a trap message in response to an event that has occurred in a managed resource.

Referring again to FIG. 3, a description will now be given of the Lightweight Directory Access Protocol (LDAP) client module 304b included in the network communications entity 304 of FIG. 3, according to an illustrative embodiment of the present invention. The LDAP module 304b utilizes LDAP, which is a standard IP based protocol for accessing common directory information. LDAP defines operations for accessing and modifying directory entries such as: searching for entries meeting user-specific criteria; adding an entry; deleting an entry; modifying an entry; and comparing an entry.

A description will now be given of the Multicast Address Dynamic Client Allocation Protocol (MADCAP) client module 304c included in the network communications entity of FIG. 3, according to an illustrative embodiment of the present invention. The MADCAP module 304c utilizes MADCAP, which is a protocol that allows hosts to request multicast address allocation services from multicast address allocation servers. When a videoconferencing session is setup to use multicasting services, the videoconference server 205 needs to obtain a multicast address to allocate to the clients in the session. The videoconference server 205 can dynamically obtain a multicast address from a multicast address allocation server using the MADCAP protocol.

A description will now be given of the Session Initiation Protocol (SIP) module 304d included in the network communications entity 304 of FIG. 3, according to an illustrative embodiment of the present invention. The SIP module 304d utilizes SIP, which is an application layer control protocol for creating, modifying and terminating multimedia sessions with one or more participants on IP based networks. SIP is a text message based protocol.

In a SIP based videoconference system, each client and server is identified by a SIP URL. The SIP URL takes the form of user@host, which is in the same format as an email address, and in most cases the SIP URL is the user's email address.

A description will now be given of the server-to-server management module 304e included in the network communications entity 304 of FIG. 3, according to an illustrative embodiment of the present invention. The server-to-server management module 304e utilizes messages for exchanging information between videoconference servers. The server-to-server management module 304e is preferably utilized in a typical deployment wherein a unique videoconference server (e.g., videoconference server 205) is set up locally to the network (e.g., LAN 225) that it is supporting, therefore several videoconference servers may exist in a company wide network (e.g., network 200). Some of the primary purposes of the messages for exchanging information include synchronizing databases and checking the availability of network resources.

The following messages are defined: QUERY—query an entry in a remote server; ADD—add an entry to a remote server; DELETE—delete an entry from a remote server; and UPDATE—update an entry on a remote server.

The server-to-server messaging can use a TCP based connection between each server. When the status of one server changes, the remaining servers are updated with the same information.

A description will now be given of operational scenarios of the videoconference server 205, according to an illustrative embodiment of the present invention. Initially, a description of operational scenarios corresponding to the setting up of a videoconference session is provided, followed by a description of operation scenarios corresponding to resolution and frame rate adjustment during the videoconference session. Session operational scenarios include SIP server discovery, member registration, session setup, session cancel, and session terminate.

A description will now be given of a session operational scenario corresponding to SIP server discovery, according to an illustrative embodiment of the present invention. A user (videoconference client application) can register with a pre-configured videoconference server (manually provisioned) or on startup by sending a REGISTER request to the well-known "all SIP servers" multicast address "sip.mcast.net" (224.0.1.75). The second mechanism (REGISTER request) is preferable because it would not require each user to manually configure the address of the local SIP server in their videoconference client application. In this case, the multicast addresses would need to be scoped correctly in the network to ensure that the user is registering to the correct SIP server for the videoconference. In addition to the previous methods, in another method to make the provisioning process simpler, the SIP specification recommends that administrators name their SIP servers using the sip.domainname convention (for example, sip.princeton.tce.com).

Figure 7:
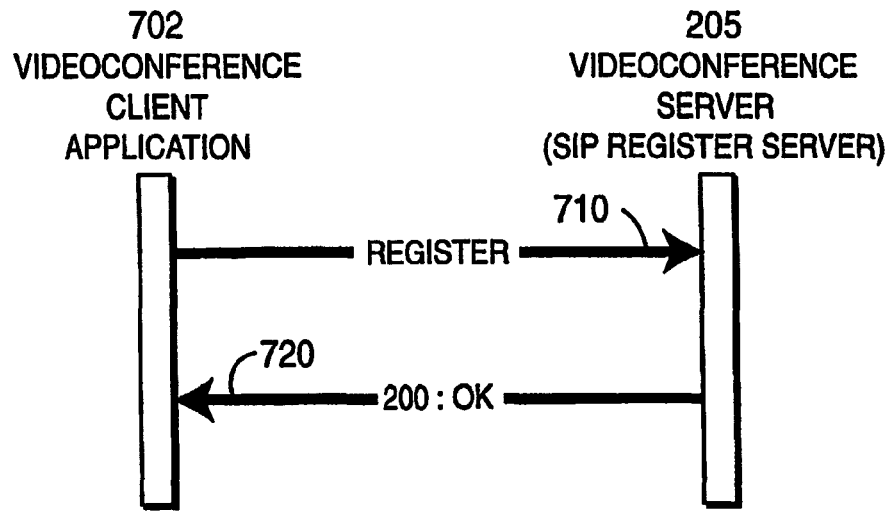
FIG. 7 is a diagram illustrating a method for registering for a videoconference session using Session Initiation Protocol (SIP), according to an illustrative embodiment of the present invention.

A description will now be given of a session operational scenario corresponding to member registration, according to an illustrative embodiment of the present invention. FIG. 7 is a diagram illustrating a method for registering for a videoconference session using Session Initiation Protocol (SIP), according to an illustrative embodiment of the present invention. The example of FIG. 7 includes a videoconference client application (client) 702 and a videoconference server (server) 205. It is to be appreciated that the phrases "client application" and "client" are used interchangeably herein.

In the member registration function, the client 702 sends a SIP REGISTER request to the server 205 (step 710). The server 205 receives this message and stores the IP address and the SIP URL of the client 702 in the member database 314.

The REGISTER request may contain a message body, although its use is not defined in the standard. The message body can contain additional information relating to configuration options of the client 702 that is registering with the server 205.

The server 205 acknowledges the registration by sending a 200 OK message back to the client 702 (step 720).

Figure 1B:
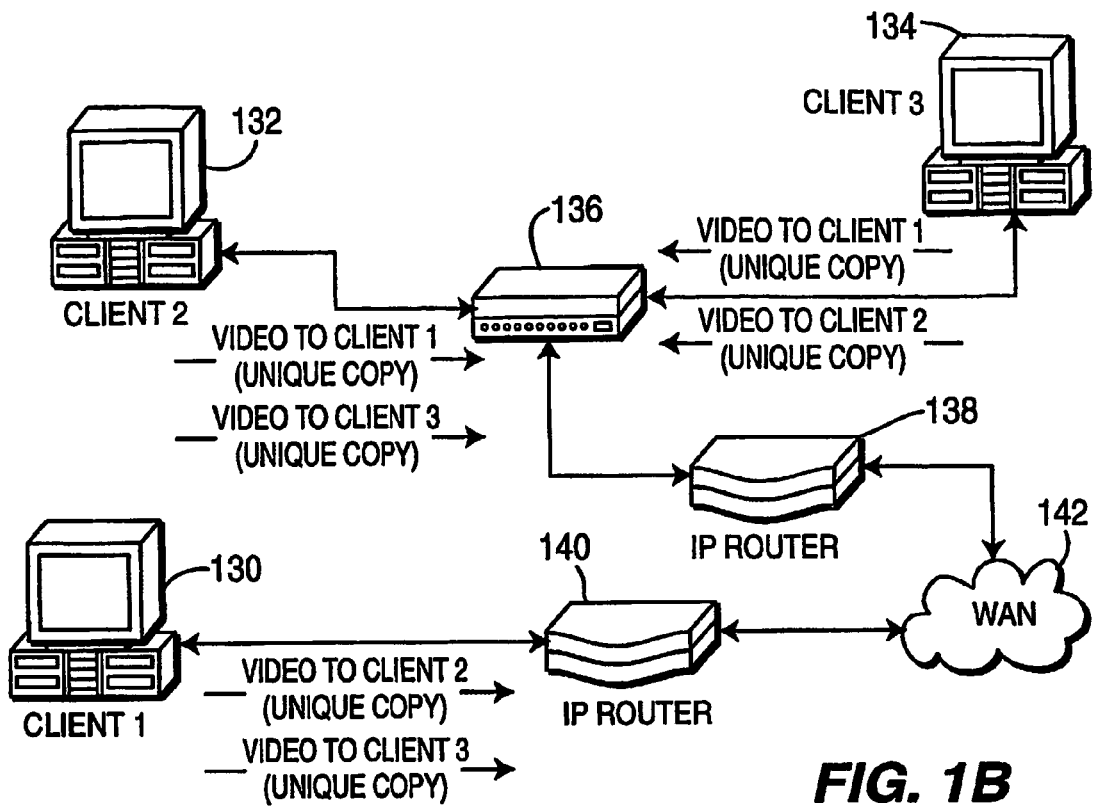
FIG. 1B is a block diagram illustrating a unicast videoconference session, according to an illustrative embodiment of the present invention.
Figure 1C:
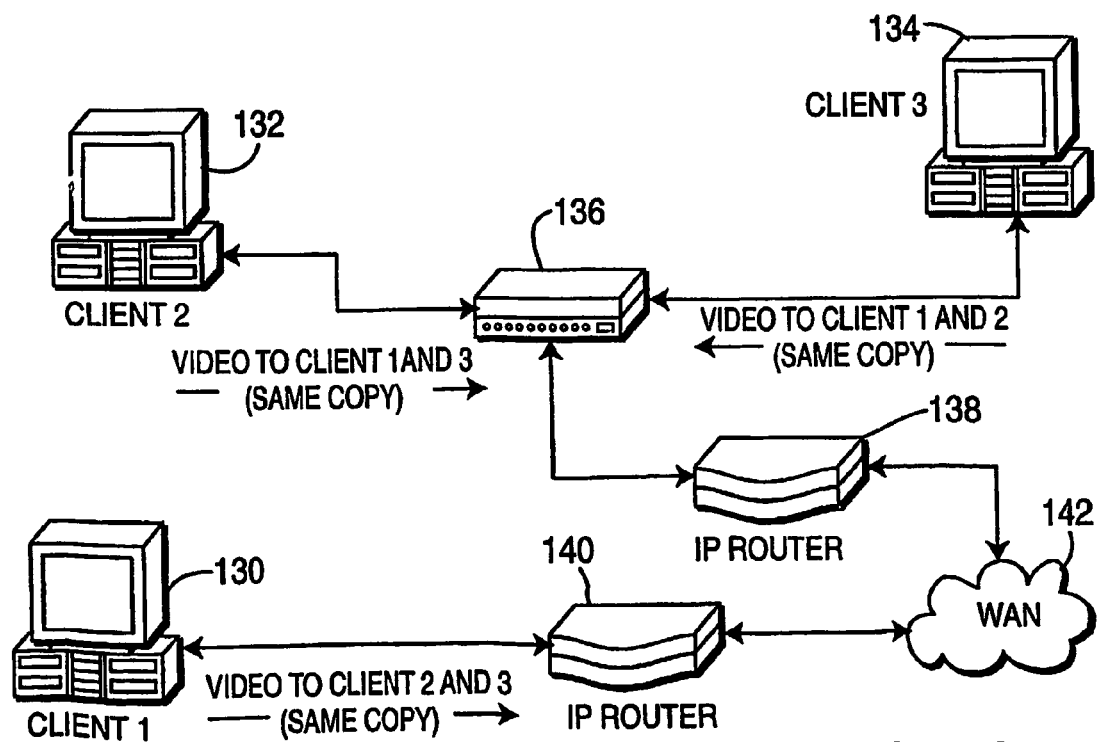
FIG. 1C is a block diagram illustrating a multicast videoconference session, according to an illustrative embodiment of the present invention.

Descriptions will now be given of unicast and multicast videoconference sessions, according to illustrative embodiments of the present invention. FIGS. 1B and 1C are block diagrams respectively illustrating a unicast videoconference session and a multicast videoconference session, according to two illustrative embodiments of the present invention. The examples of FIGS. 1B and 1C includes a client 1130, a client 2132, a client 3134, an Ethernet switch 136, an IP router 138, and an IP router 140, and a WAN 142.

In the unicast example, a unique stream is sent from each client to each other client. Such an approach can consume a large amount of bandwidth as more participants join the network. In contrast, in the multicast approach, only one stream is sent from each client. Thus, the multicast approach consumes less of the network resources such as bandwidth in comparison to the unicast approach.

Figure 8A:
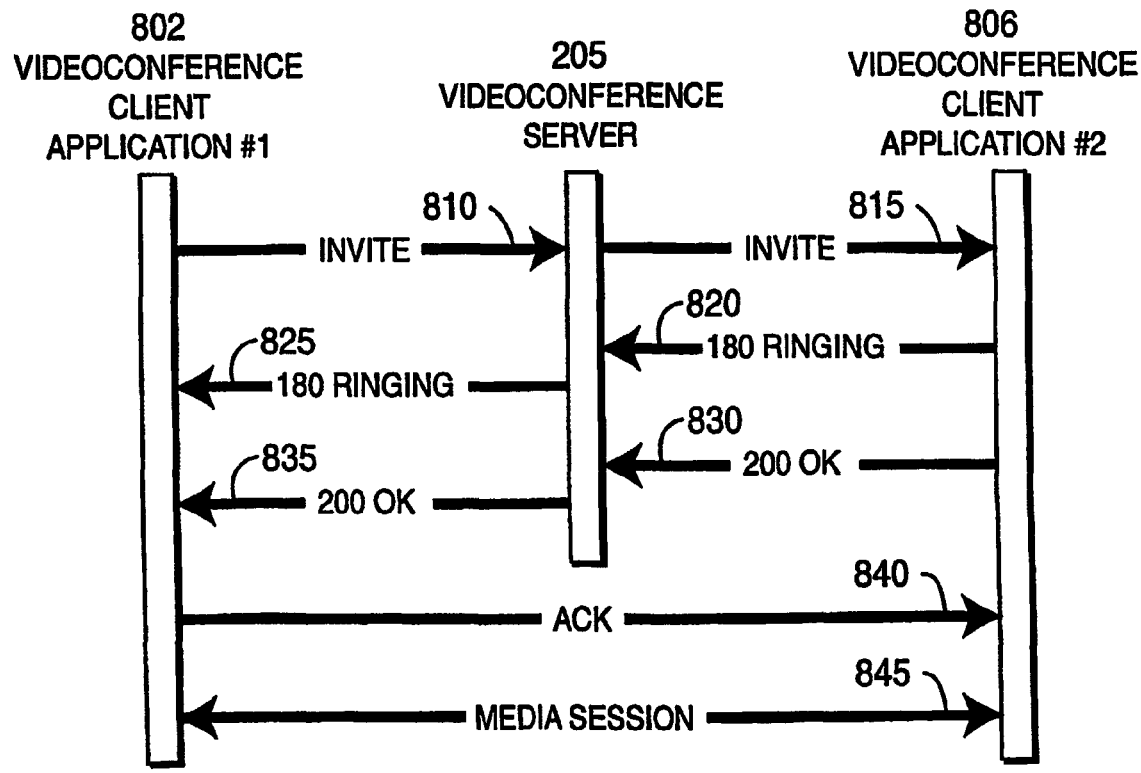
FIG. 8A is a diagram illustrating a method for setting up a unicast videoconference session using Session Initiation Protocol (SIP), according to an illustrative embodiment of the present invention.

A description will now be given of a session operational scenario corresponding to a unicast videoconference session set up, according to an illustrative embodiment of the present invention. FIG. 8A is a diagram illustrating a method for setting up a unicast videoconference session using Session Initiation Protocol (SIP), according to an illustrative embodiment of the present invention. The example of FIG. 8A includes a videoconference client application #1 (client #1) 802, a videoconference server (server) 205, and a videoconference client application #2 (client #2) 806.

An INVITE request is sent from the client #1 802 to the server 205 (step 810). The INVITE request is forwarded from the server 205 to the client #2 806 (step 815).

A 180 ringing message is sent from the client #2 706 to the server 205 (step 820). The 180 ringing message is forwarded from the server 205 to the client #1 702 (step 825).

A 200 OK message is sent from the client #2 706 to the server 205 (step 830). The 200 OK message is forwarded from the server 205 to the client #1 702 (step 835).

An acknowledge message ACK is sent from the client #1 702 to the client #2 706 (step 840). The videoconference session (media session) takes place between the two nodes (clients #1 802 and #2 806) (step 845).

Figure 8B:
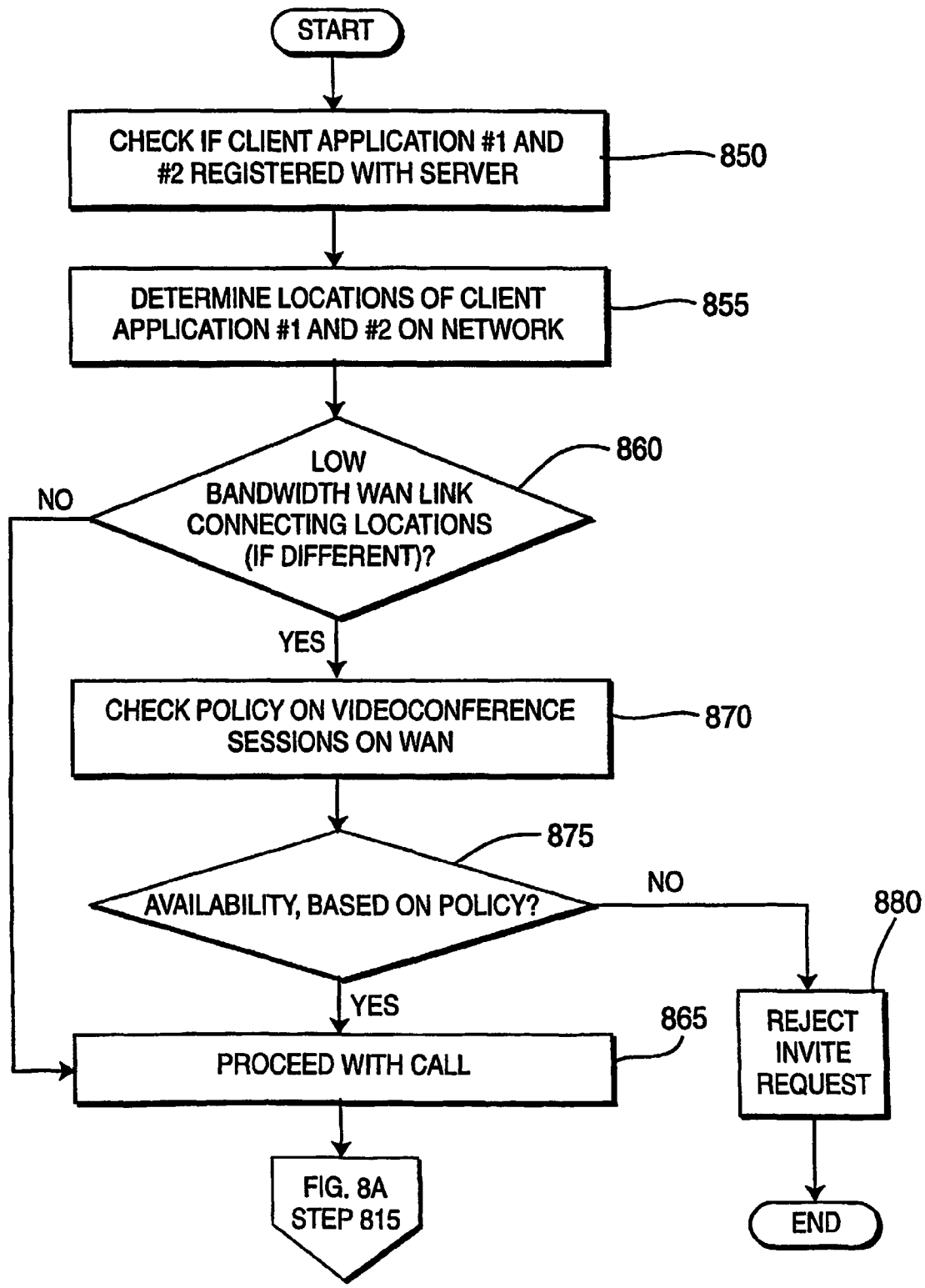
FIG. 8B is a diagram illustrating the steps taken by the videoconference server 205 of FIG. 2 when an INVITE request is received from the client #1 802 (step 810 of FIG. 8A), according to an illustrative embodiment of the present invention.

FIG. 8B is a diagram illustrating the steps taken by the videoconference server 205 when an INVITE request is received from the videoconference client application #1 802 (step 810 of FIG. 8A), according to an illustrative embodiment of the present invention.

The server 205 initially checks to see if the requesting user (client #1 802) is registered with the server 205 and it also checks to see if the user that is being called (client #2 806) is registered with the server 205 (step 850).

The server 205 determines the location of each user on the network (step 855) and determines if there is a low bandwidth WAN link (e.g., WAN 250) connecting their two locations (if different) (step 860).

If there is not a low bandwidth link WAN connecting the two locations together, the server 205 proceeds with the call (step 865). However, if there is a low bandwidth link between the two users, then the method proceeds to step 870.

At step 870, the server 205 checks the policy on videoconference sessions on the WAN 250; this basically translates into "X sessions can take place at a maximum bit rate of Y". The server 205 checks for availability based on this policy (step 875). If there is no availability, then the server 205 rejects the INVITE request by sending any of the following messages, "600—Busy Everywhere", "486—Busy Here", "503—Service Unavailable", or "603—Decline" (step 880), and the method is terminated (without continuation to step 815 of the method of FIG. 8A). However, if there is availability, then the server 205 proceeds with the call (step 865). It is to be appreciated that step 865 is followed by step 815 of the method of FIG. 8A.

Figure 9:
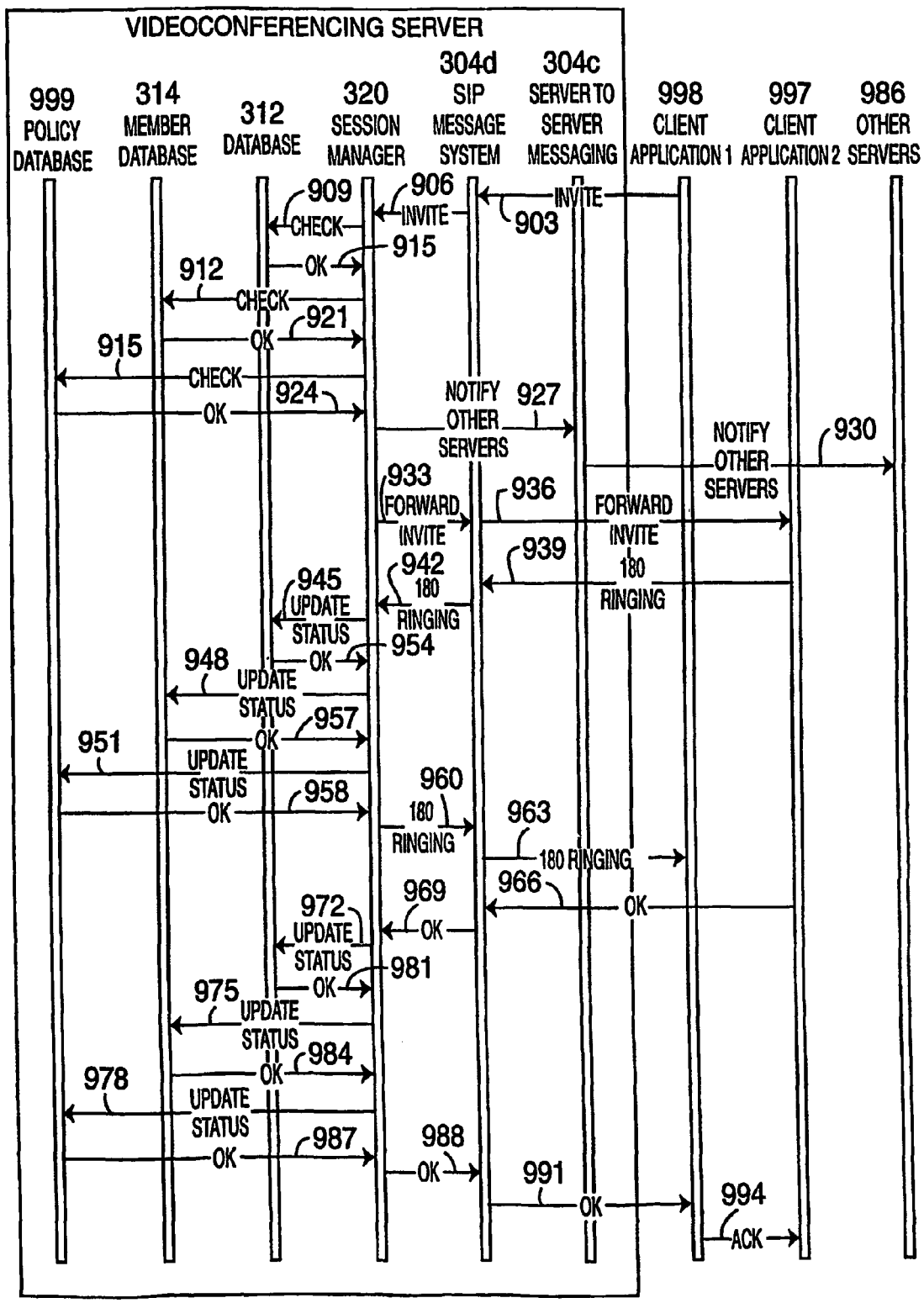
FIG. 9 is a diagram further illustrating the method of FIG. 8A, according to an illustrative embodiment of the present invention.

FIG. 9 is a diagram further illustrating the method of FIG. 8A, according to an illustrative embodiment of the present invention. The example of FIG. 9 includes a client application 1 998, a client application 2 997, videoconference server 205, and other videoconference servers 986. Elements of the videoconference server 205 that are also shown in FIG. 9 include member database 314, active session database 312, a policy database 999 that is included in network architecture database 316, session manager 320, SIP module 304*d*, and server to server management module 304*e*.

FIG. 9 is provided to depict the internal interaction within the videoconference server 205, and thus is only shown at a basic level to provide an example of the signaling flow between the entities of the videoconference server 205.

An INVITE request is sent from client application 1 998 to SIP module 304*d* within the videoconference server 205 (step 903). The SIP module 304*d* decodes the message and forwards the INVITE requires to the session manager 320 (step 906). The session manager 320 checks the active session database 312, the member database 314, and the policy database 999 within the network architecture database 316 to ensure that the session can be correctly set up (steps 909, 912, and 915, respectively). If the session can be correctly set up, then the active session database 312, the member database 314, and the policy database 999 transmit an OK message to the session manager 320 (steps 918, 921, and 924). Once this verification process is completed, the videoconference server 205 will notify other videoconferencing servers of the change in system status (step 927 and 930).

The session manager 320 will forward an INVITE message to the SIP module 304*d* (step 933) which will then forward the INVITE message to client application 2 997 (step 936). Upon receiving the INVITE message, client application 2 997 will respond to the SIP module 304*d* with a 180 Ringing message that indicates that the SIP module 304*d* has received the INVITE message (step 939). The 180 Ringing message is received by the SIP module 304*d*, decoded and then forwarded to the session manager 320 (step 942). The status of the client is updated (steps 945, 948, 951, 954, 957, and 958) in each of the databases shown in FIG. 9 within the videoconference server 205.

The 180 Ringing message is forwarded from the session manager 320 to client application 1 998 (step 960 and 963). A 200 OK message is then sent from client application 2 997 to the SIP module 304*d* (step 966) and forwarded from the SIP module 304*d* to the session manager 320 (step 969). The 200 OK message indicates that client application 2 997 is accepting the invitation for the videoconference session.

The status of the client is updated (steps 972, 975, 978, 981, 984, and 985) in each of the databases shown in FIG. 9 within the videoconference server 205. An OK message is sent from session manager 320 to SIP module 304*d* and is forwarded from SIP module 304*d* to client application 1 998 (steps 988 and 991). An ACK message is sent from client application 1 998 to client application 2 987 completing the session set up (step 994).

A description will now be given of a session operational scenario corresponding to a multicast videoconference session set up, according to an illustrative embodiment of the present invention. To provide multicast session set up, the Session Description Protocol (SDP) is used. The SDP protocol is able to convey the multicast address and port numbers.

The multicast session setup is similar to the unicast session setup except that a multicast address is required. The multicast address is allocated by the MADCAP server 215 in the network.

Figure 10:
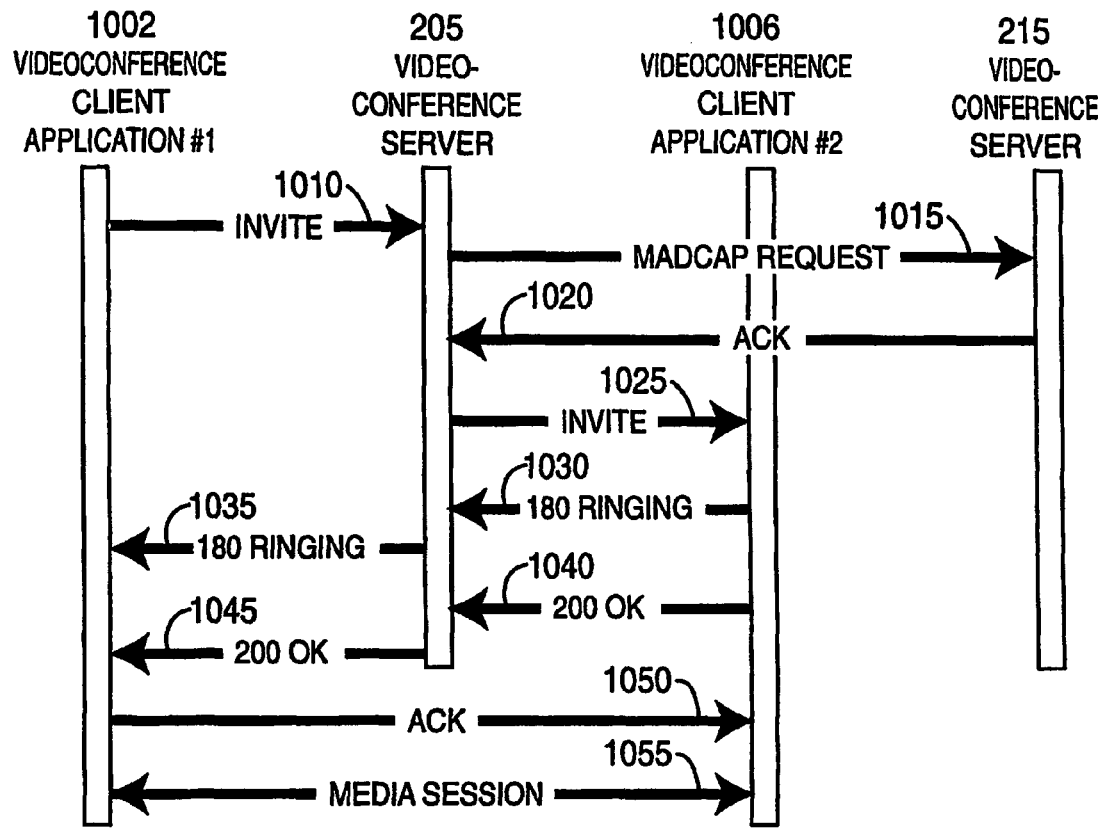
FIG. 10 is a diagram illustrating a method for setting up a multicast videoconference session using Session Initiation Protocol (SIP), according to another illustrative embodiment of the present invention.

FIG. 10 is a diagram illustrating a method for setting up a multicast videoconference session using Session Initiation Protocol (SIP), according to another illustrative embodiment of the present invention. The example of FIG. 10 includes a videoconference client application #1 (client #1) 1002, a videoconference server (server) 205, a videoconference client application #2 (client #2) 1006, and a MADCAP server 215.

An INVITE request is sent from the client #1 1002 to the server 205 (step 1010). A MADCAP request is sent from the server 205 to the MADCAP server 215 (step 1015). An acknowledge message ACK is sent from the MADCAP server 215 to the server 205 (step 1020). The INVITE request is forwarded from the server 205 to the client #2 1006 (step 1025).

A 180 ringing message is sent from the client #2 1006 to the server 205 (step 1030). The 180 ringing message is forwarded from the server 205 to the client #1 1002 (step 1035).

A 200 OK message is sent from the client #2 1006 to the server 205 (step 1040). The 200 OK message is forwarded from the server 205 to the client #1 1002 (step 1045).

An acknowledge message ACK is sent from the client #1 1002 to the client #2 1006 (step 1050). The videoconference session (media session) takes place between the two nodes (clients #1 1002 and #2 1006) (step 1055).

A description will now be given of a session operational scenario corresponding to the cancellation of a videoconference session, according to an illustrative embodiment of the present invention. The CANCEL message is used to terminate pending session set up attempts. A client can use this message to cancel a pending videoconference session set up attempt the client had earlier initiated. The server forwards the CANCEL message to the same locations with pending requests that the INVITE was sent to. The client should not respond to the CANCEL message with a "200 OK" message. If the CANCEL message is unsuccessful, then the session terminate sequence (i.e., BYE message) can be used.

Figure 11:
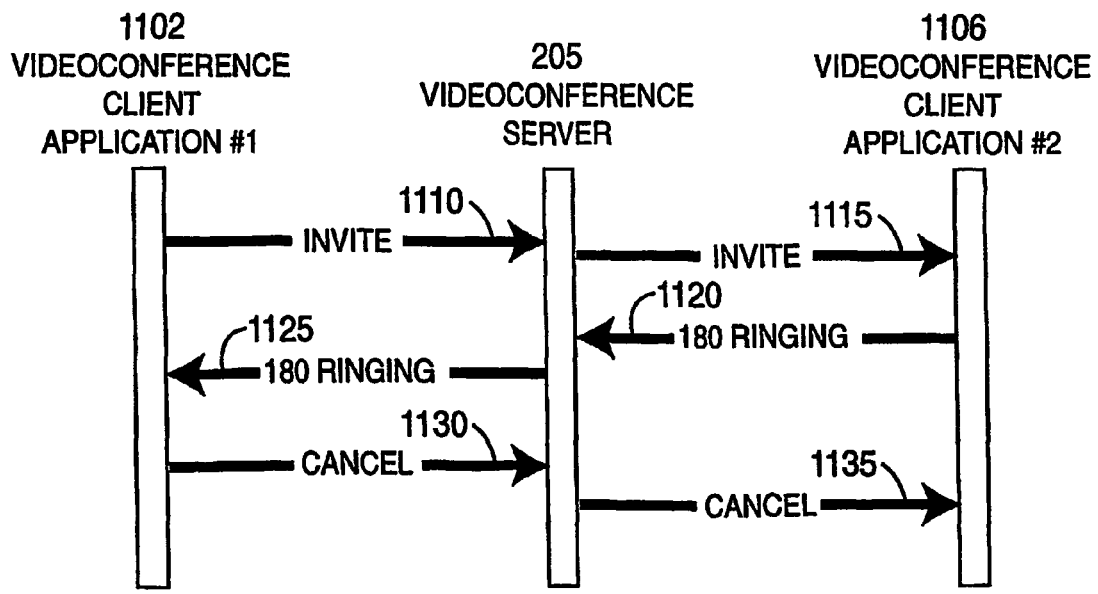
FIG. 11 is a diagram illustrating a method for canceling a videoconference session using Session Initiation Protocol (SIP), according to an illustrative embodiment of the present invention.

FIG. 11 is a diagram illustrating a method for canceling a videoconference session using Session Initiation Protocol (SIP), according to an illustrative embodiment of the present invention. The example of FIG. 11 includes a videoconference client application #1 (client #1) 1102, a videoconference server (server) 205, and a videoconference client application #2 (client #2) 1106.

An INVITE request is sent from the client #1 1102 to the server 205 (step 1110). The INVITE request is forwarded from the server 205 to the client #2 1106 (step 1115).

A 180 ringing message is sent from the client #2 1106 to the server 205 (step 1120). The 180 ringing message is forwarded from the server 205 to the client #1 1102 (step 1125).

A CANCEL message is sent from the client #1 1102 to the server 205 (step 1130). The CANCEL message is forwarded from the server 205 to the client #2 1106 (step 1135).

Figure 12:
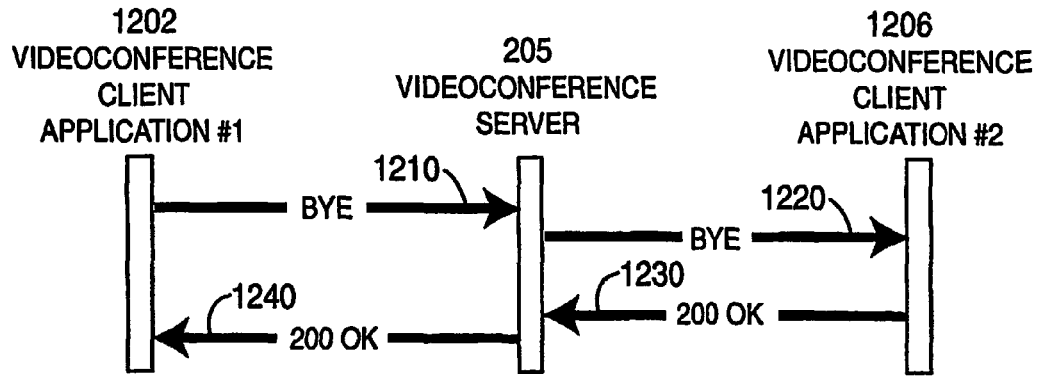
FIG. 12 is a diagram illustrating a method for terminating a videoconference session between two clients using Session Initiation Protocol (SIP), according to an illustrative embodiment of the present invention.

A description will now be given of a session operational scenario corresponding to the termination of a videoconference session, according to an illustrative embodiment of the present invention. FIG. 12 is a diagram illustrating a method for terminating a videoconference session between two clients using Session Initiation Protocol (SIP), according to an illustrative embodiment of the present invention. The example of FIG. 12 includes a first client (videoconference client application #1) 1202, a videoconference server (server) 205, and a second client (videoconference client application #2) 1206.

The client #1 1202 decides to discontinue a call with the client #2 1206. Thus, the client #1 1202 sends a BYE message to the server 205 (step 1210). The server 205 forwards the BYE message to client #2 1206 (step 1220).

The client #2 1206 sends a 200 OK message back to the server 205 indicating it (client #2 1206) has disconnected (step 1230). The server 205 forwards the 200 OK message to client #1 1202 indicating a successful disconnect (step 1240).

Figure 13:
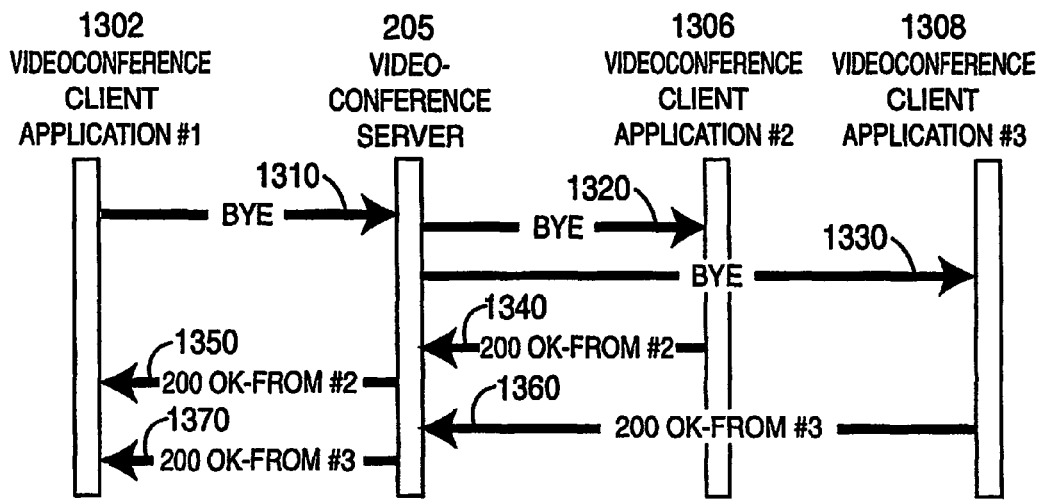
FIG. 13 is a diagram illustrating a method for terminating a videoconference session between three clients using Session Initiation Protocol (SIP), according to an illustrative embodiment of the present invention.

FIG. 13 is a diagram illustrating a method for terminating a videoconference session between three clients using Session Initiation Protocol (SIP), according to an illustrative embodiment of the present invention. The example of FIG. 13 includes a first client (videoconference client application #1) 1302, a videoconferencing server (server) 205, a second client (videoconference client application #2) 1306, and a third client (videoconference client application #3) 1308.

The client #1 1302 decides to discontinue a call with the client #2 1306 and the client #3 1308; this does not tear down the session between the client #2 1306 and the client #3 1308.

The client #1 1302 sends a BYE message to the server 205 (step 1310). The server 205 interprets the BYE message and understands that the client #2 1306 and the client #3 1308 are involved in the videoconference session with the client #1 1302 and forwards the BYE message to both client #2 1306 and client #3 1308 (steps 1320 and 1330).

The client #2 1306 sends a 200 OK message back to the server 205 (step 1340). The server 205 forwards the 200 OK message back to client #1 1302 (step 1350). The client #3 1308 sends a 200 OK message back to the server 205 (step 1360). The server 205 forwards the 200 OK message back to client #1 1302 (step 1370).

Figure 14:
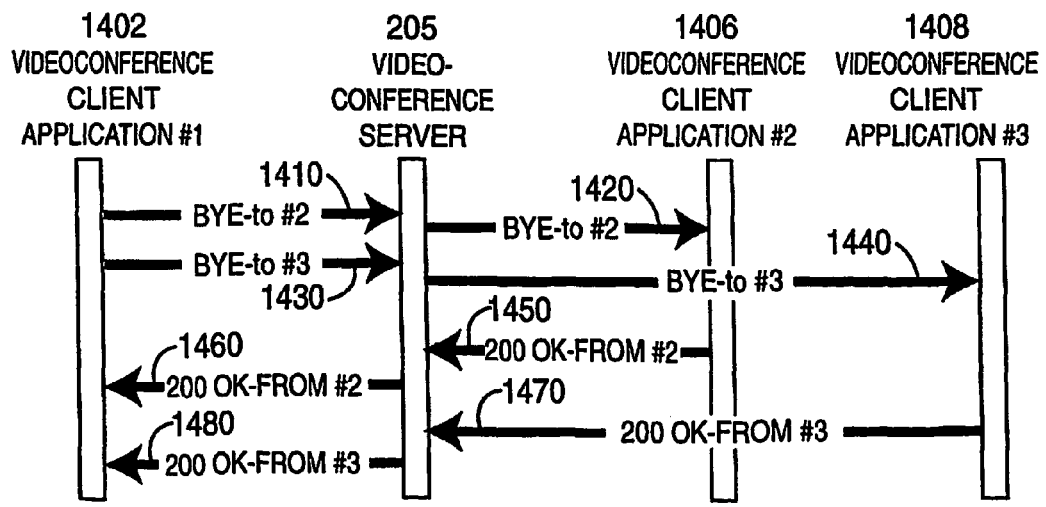
FIG. 14 is a diagram illustrating a method for terminating a videoconference session between three clients using Session Initiation Protocol (SIP), according to another illustrative embodiment of the present invention.

FIG. 14 is a diagram illustrating a method for terminating a videoconference session between three clients using Session Initiation Protocol (SIP), according to another illustrative embodiment of the present invention. The example of FIG. 14 includes a first client (videoconference client application #1) 1402, a videoconference server (server) 205, a second client (videoconference client application #2) 1406, and a third client (videoconference client application #3) 1406.

The client #1 1402 decides to discontinue the call with the client #2 1406 and the client #3 1406; this does not tear down the session between the client #2 1406 and the client #3 1406.

The client #1 1402 sends a BYE message to the server 205 intended for the client #2 1406 (step 1410). The server 205 forwards the BYE message to the client #2 1406 (1420). The client #1 1402 sends a BYE message to the server 205 intended for client #3 1406 (1430). The server 205 forwards the BYE message to the client #3 1406 (step 1440).

The client #2 1406 sends a 200 OK message back to the server 205 (step 1450). The server 205 forwards the 200 OK message back to the client #1 1402 (step 1460). The client #3 1408 sends a 200 OK message back to the server 205 (step 1470). The server 205 forwards the 200 OK message back to the client #1 1402 (step 1480).

In addition to the previous examples described with respect to FIGS. 12 through 14, a termination can be invoked by transmitting the BYE message to the multicast group address to which belong the videoconference subscribers. Using this method, the server and the other client applications will receive the message. It is a more universal and efficient mechanism for terminating the session due to the lower amount of overhead associated with it.

A description will now be given of operation scenarios corresponding to resolution and frame rate adjustment, according to an illustrative embodiment of the present invention. Videoconferencing involves transmitting live, two-way interactive video between several users at different locations on a computer network. Real-time interactive video requires transmission of large amounts of information with constrained delay. This requires that the computer network that the videoconference system is tied to must be able to provide an adequate amount of bandwidth and quality of service for each user involved in the session. Bandwidth can be a limited resource at times and quality of service cannot always be guaranteed in all networks, therefore some limitations will exist. In a private corporate network, it is possible to guarantee quality of service, but it is not always possible to guarantee large amounts of bandwidth.

The basic corporate computer network infrastructure includes several high speed local area networks (LANs) connected together through low speed links (see, e.g., FIG. 2). Each of the high speed LANs usually represent the network infrastructure at a single geographical location and the low speed links are the long haul links that connect the multiple geographic locations together. The reason low speed links are used is because the cost of the long haul links are relatively high and also most of the network traffic is usually localized within a local area network, therefore large amounts of data are not usually exchanged over these long haul links.

Recent advances in quality of service over IP based networks are now providing a means for allowing other types of information to be transmitted across these networks. This opens the door for transmitting real-time information (i.e., audio and video) across the infrastructure in addition to the non-real-time data traffic. Video conferencing services that take advantage of network quality of service are well suited to overlay onto this infrastructure. It is now possible that two users at two different geographic locations can take place in a real-time videoconference session. One disadvantage of a videoconference session is that the transmission of real-time video can consume an extremely large amount of bandwidth and easily deplete available network resources. The bit rates of real-time video transmitted across a network mainly depend on the video resolutions and compression algorithms used. Typically, one videoconference session between two, three, or four users at different geographic locations can be properly supported on a network with a reasonable amount of bandwidth. However, it has been the case that, in general, additional users beyond four in a videoconference session could not be supported nor could a second videoconference session be supported due to bandwidth constraints. The limiting factors of the videoconference system are the low speed long haul links between the geographic locations.

One possible solution is to increase the bandwidth of the long haul links between the two geographic locations in order to support more users in the system. The drawback to this approach is that the bandwidth is very expensive. A second solution is to have a system where only a limited amount of users (i.e., the active users) in the videoconference session are allowed to transmit at a high resolution and high bit-rate, and the remaining users (i.e., the passive users) in the session can only transmit at a limited bit-rate and limited resolution. The videoconference session organizer will have control of which users will transmit in high resolution and which users will transmit in low resolution. If a user is not actively talking or interacting in the session, then there is no need to send their video in high resolution. Such an approach can provide a tremendous amount of savings in bandwidth.

Figure 18A:
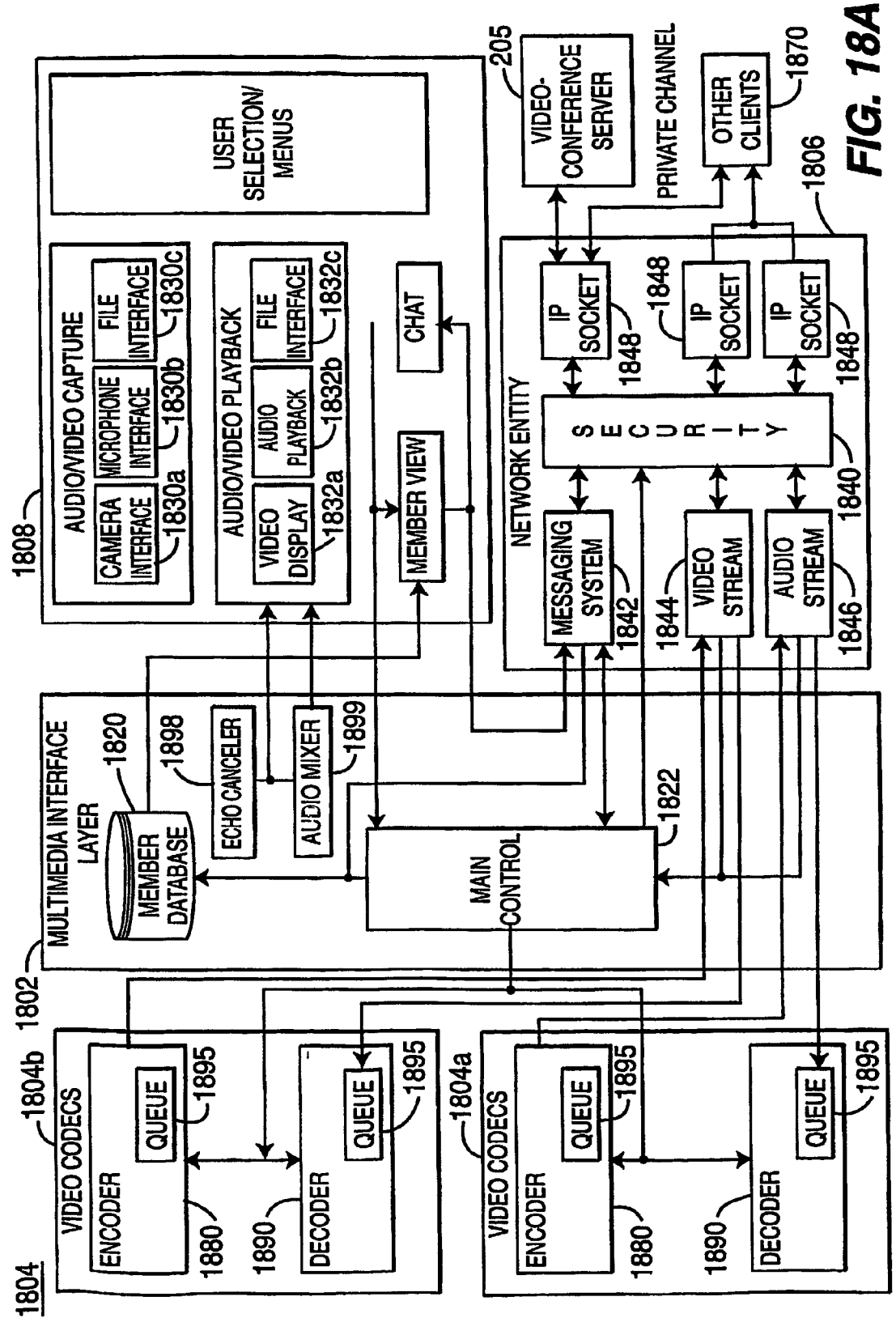
FIG. 18A is a block diagram of a videoconference client application 1800, according to an illustrative embodiment of the present invention.

Referring ahead to the videoconference client application 1800 of FIG. 18A, this approach involves having a user interface 1808 in the videoconference client application 1800 that supports various window sizes (i.e., different sized display windows to represent the high-resolution and low-resolution decoded video streams) and a messaging system 1842 (included in the network entity 1806 that, in turn, is included in the videoconference client application 1800 of FIG. 18A) that specifies communication between the server 205 and the other client's applications. The messaging system 1842 will include messages that control the encoding resolution and transmitting bit-rate of each of the client's applications.

A description will now be given of messages corresponding to resolution and frame rate adjustment, according to an illustrative embodiment of the present invention. In particular, an MSG_WINDOW_SWITCH message and a MSG_ADJUST_CODEC message will be described.

The MSG_WINDOW_SWITCH message is sent from the client to the server indicating a switch between an active user and a passive user; that is, the active user becomes passive, and the passive user becomes active. The videoconference server will acknowledge this request with the client.

The MSG_ADJUST_CODEC message is sent from the server to each client. The MSG_ADJUST_CODEC message will indicate to the client what resolution (i.e., CIF or QCIF) and frame rate the client should be sending. The MSG_ADJUST_CODEC message is acknowledged by each client.

Figure 15:
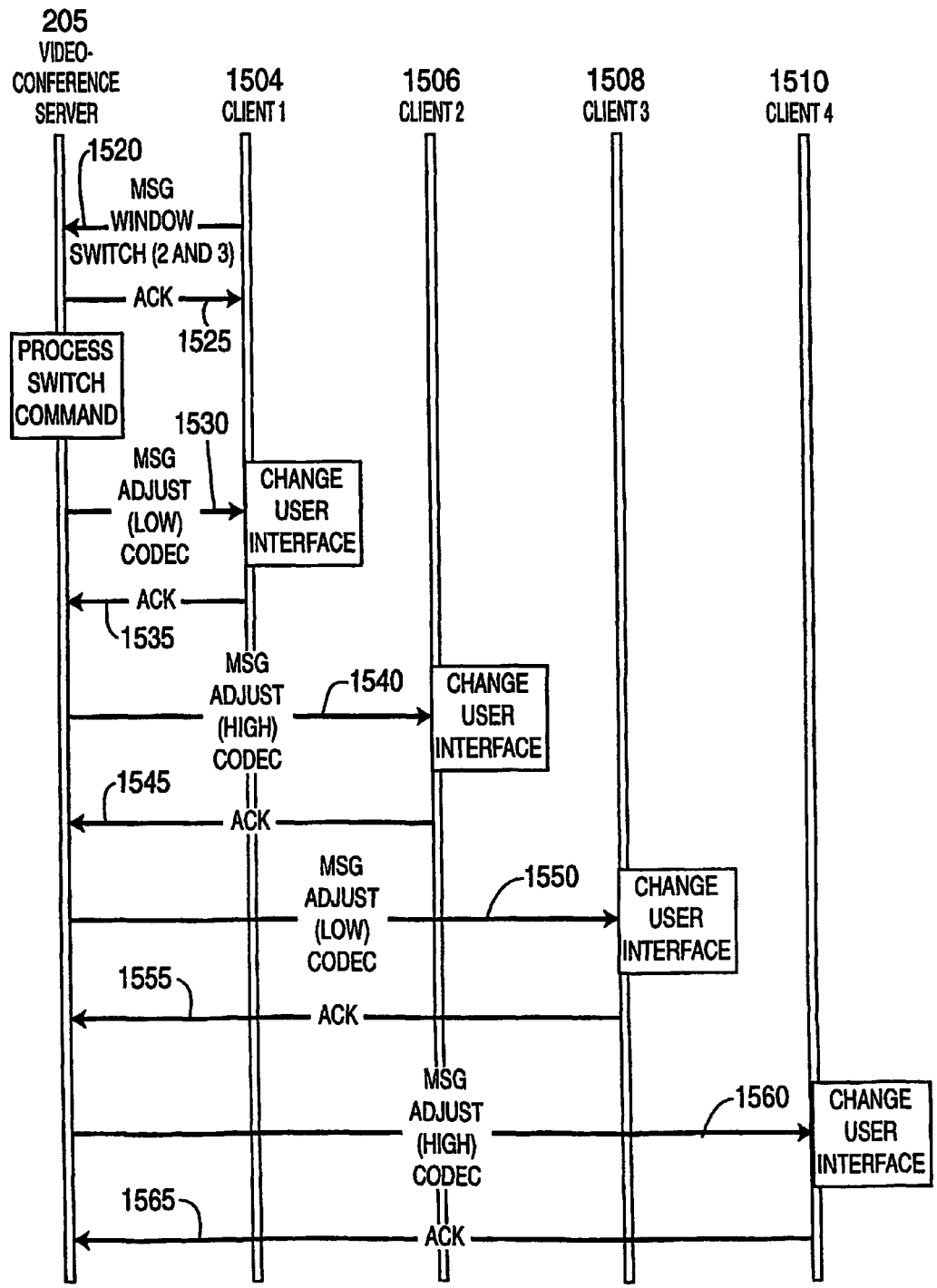
FIG. 15 is a diagram illustrating a signaling method for resolution and frame rate adjustment, according to an illustrative embodiment of the present invention.

FIG. 15 is a diagram illustrating a signaling method for resolution and frame rate adjustment, according to an illustrative embodiment of the present invention. The example of FIG. 15 includes a videoconference server (server) 205, a client 1 1504, a client 2 1506, a client 3 1508, and a client 4 1510.

A MSG_WINDOW_SWITCH message is sent from the client 1 1504 to the server 205 (step 1520). An acknowledge message ACK is sent from the server 205 to the client 1 1504 (step 1525).

A MSG_ADJUST_CODEC (low) message is sent from the server 205 to client 1 1504 (step 1530). An acknowledge message ACK is sent from client 1 1504 to the server 205 (step 1535).

A MSG_ADJUST_CODEC (high) message is sent from the server 205 to the client 2 1506 (step 1540). An acknowledge message ACK is sent from the client 2 1506 to the server 205 (step 1545).

A MSG_ADJUST_CODEC (low) message is sent from the server 205 to the client 3 1508 (step 1550). An acknowledge message ACK is sent from the client 3 1508 to the server 205 (step 1555).

A MSG_ADJUST_CODEC (low) message is sent from the server 205 to the client 4 1510 (step 1560). An acknowledge message ACK is sent from the client 4 1510 to the server 205 (step 1565).

Figure 16:
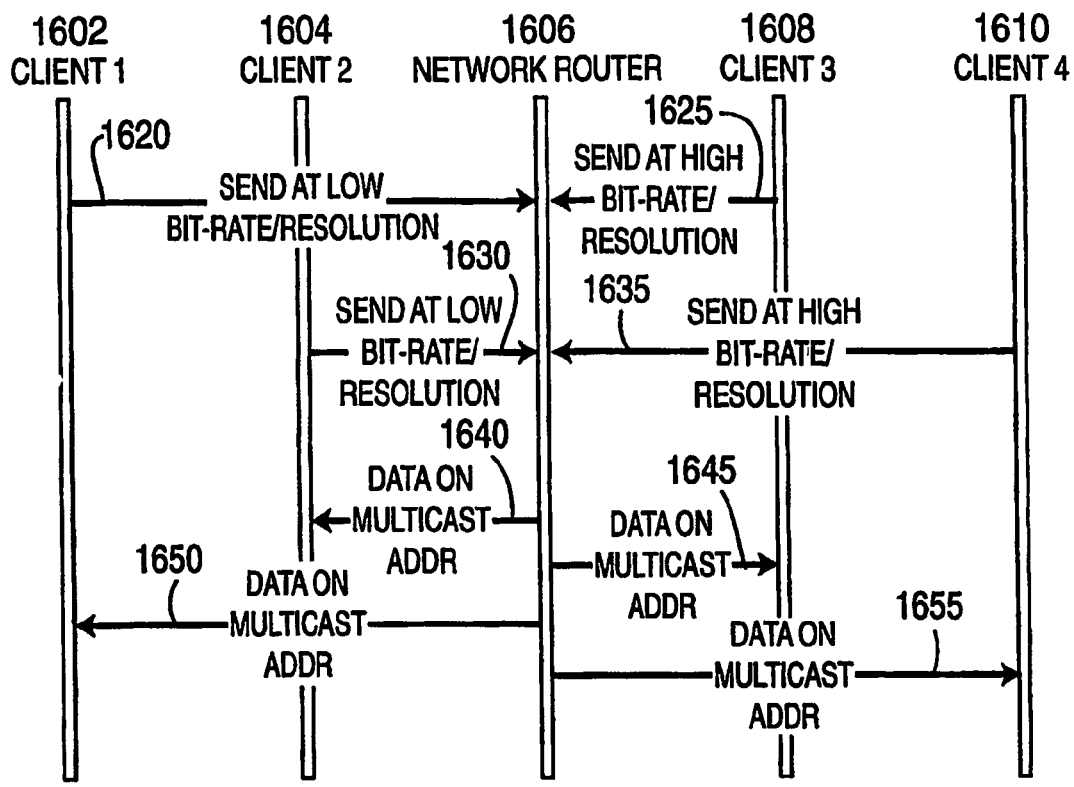
FIG. 16 is a diagram illustrating signaling before resolution and frame rate adjustment (clients 2 and 3), according to an illustrative embodiment of the present invention.
Figure 17:
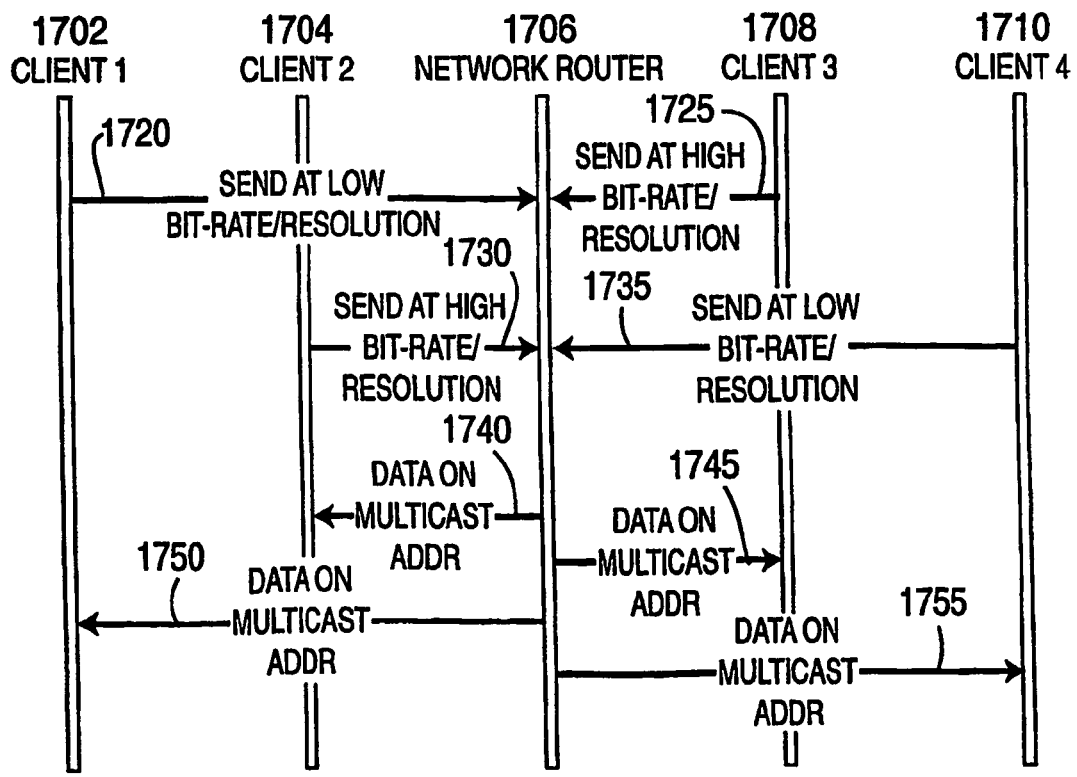
FIG. 17 is a diagram illustrating signaling after resolution and frame rate adjustment (clients 2 and 3), according to an illustrative embodiment of the present invention.

FIG. 16 is a diagram illustrating signaling before resolution and frame rate adjustment (clients 2 and 3), according to an illustrative embodiment of the present invention. FIG. 17 is a diagram illustrating signaling after resolution and frame rate adjustment (clients 2 and 3), according to an illustrative embodiment of the present invention. The examples of FIGS. 16 and 17 include a client 1 1602, a client 2 1604, a network router 1606, a client 3 1608, and a client 4 1610.

A "send at low bit-rate/resolution" message is sent from the client 1 1602 to network router 1606 (step 1620). A "send at high bit-rate/resolution" message is sent from the client 3 1608 to network router 1606 (step 1625). A "send at low bit-rate/resolution" message is sent from the client 2 1604 to network router 1606 (step 1630). A "send at high bit-rate/resolution" message is sent from the client 4 1610 to network router 1606 (step 1635).

Data is sent from the network router 1606 to the client 2 1604, the client 3 1608, the client 1 1602, and the client 4 1610, using the multicast address (steps 1640, 1645, 1650, and 1655, respectively).

Proceeding to FIG. 17, a "send at low bit-rate/resolution" message is sent from the client 1 1602 to network router 1606 (step 1720). A "send at high bit-rate/resolution" message is sent from the client 3 1608 to network router 1606 (step 1725). A "send at high bit-rate/resolution" message is sent from the client 2 1604 to network router 1606 (step 1630). A "send at low bit-rate/resolution" message is sent from the client 4 1610 to network router 1606 (step 1635).

Data is sent from the network router 1606 to the client 2 1604, the client 3 1608, the client 1 1602, and the client 4 1610, using the multicast address (steps 1740, 1745, 1750, and 1755, respectively).

A description will now be given of a client application architecture, according to an illustrative embodiment of the present invention. The client application is responsible for interacting with a user, exchanging of multimedia content with other client applications and for managing calls with the server application. FIG. 18A is a block diagram of a videoconference client application 1800, according to an illustrative embodiment of the present invention. It is to be appreciated that the videoconference client application 1800 may be found on a computer such as any of computers 220*a*-*f* and/or any of computers 230*a*-*c*.

The videoconference client application 1800 includes the following four basic functional entities: a multimedia interface layer 1802; codes 1804 (audio codecs 1804*a* & video codecs 1804*b*); a network entity 1806; and a user interface 1808.

The multimedia interface layer 1802 is the main controlling instance of the videoconference client application 1800. All intra-system communication is routed through and controlled by the multimedia interface layer 1802. One of the key underlying features of the multimedia interface layer 180 is the ability to easily interchange different audio and video codecs 1804. In addition to this, the multimedia interface layer 1802 provides an interface to the Operating System (OS) dependent user input/output entity and network sub-systems. The multimedia interface layer 1802 includes a member database 1820, a main control module 1822, an audio mixer 1899, and an echo cancellation module 1898.

The user interface 1808 provides the point of interaction for an end user with the videoconference client application 1800. The user interface 1808 is preferably but not necessarily implemented as an OS dependent module. Many graphical user interfaces are dependent on the particular OS that they are using. The four major functions of the user interface 1808 are video capture, video display, audio capture, and audio reproduction. The user interface 1808 includes an audio/video capture interface 1830, an audio/video playback module 1832, a member view module 1834, a chat module 1836, and user selection/menus 1838. The audio/video capture interface 1830 includes a camera interface 1830*a*, a microphone interface 1830*b*, and a file interface 1830*c*. The audio/video playback module 1834 includes a video display 1832*a*, an audio playback module 1832*b*, and a file interface 1832*c*.

The network entity 1806 represents the communication sub-system of the videoconference client application 1800. The functions of the network entity 1806 are client to server messaging that is based on Session Initiation Protocol (SIP) and the transmission and reception of audio and video streams. The network entity 1806 also includes basic security functions for authentication and cryptographic communication of the media streams between clients. The network entity 1806 includes a security module 1840, a messaging system 1842, a video stream module 1844, an audio stream module 1846, and IP sockets 1848*a*-*c*.

The audio codecs 1804*a* and the video codecs 1804*b* are the sub-systems that handle the compression and decompression of the digital media. The interfaces to the codecs should be simple and generic in order to make interchanging them easy. A simple relationship between the multimedia interface layer 1802 and the codecs 1804 is defined herein after as an illustrative template or guide for implementation. The audio codecs 1804*a* and video codecs 1804*b* each include an encoder 1880 and a decoder 1890. The encoder 1880 and decoder 1890 each include a queue 1895.

The videoconference client application 1800 interfaces with, at the least, the videoconference server 205 and other clients 1870.

A description will now be given of the member database 1820 included in the multimedia interface layer 1802 of FIG. 18A, according to an illustrative embodiment of the present invention. The member database 1820 stores information about each participating user on a per session basis. The member database 1820 includes information pertaining to the sending/receiving IP address, client capabilities, information about particular codecs, and details about the status of the different users. It is to be appreciated that the preceding items are merely illustrative and, thus, other items in addition to or in place of some or all of the preceding items may also be kept in the member database 1820, while maintaining the spirit and scope of the present invention. The information included in the member database 1820 is used for controlling incoming information destined for the audio and video decoders 1890. The media information incoming from the network needs to be routed to the correct audio and video decoders 1890. Equally important, the media information coming from the audio and video encoders 1890 needs to be routed to the correct unicast or multicast address for distribution. Basic information included in the member database 1820 is also routed to the user interface 1808 in order for the end user to be aware of the participants in the session and their capabilities. A user is added to the member database 1820 as soon as an INVITE request is received from the videoconference server 205 and a user is removed as soon as a BYE request is received from the videoconference server 205. The member database 1820 is flushed when a session is terminated.

A description will now be given of the main control module 1822 included in the multimedia interface layer 1802 of FIG. 18A, according to an illustrative embodiment of the present invention.

The main control module 1822 is a very important part of the multimedia interface layer 1802. The main control module 1822 functions as the central management sub-system and provides the following key functions: synchronization mechanism for audio and video decoders and playback; connects destination of a decoder to screen or to file for recording purposes; and application layer Quality of Service.

The synchronization of audio and video playback is crucial for an optimal videoconferencing user experience. In order to accurately synchronize the two media streams, timestamps will need to be used and transmitted with the media content. Real Time Protocol (RTP) provides a generic header for including timestamps and sequence numbers for this purpose. The timestamps provided are NOT intended to synchronize the two network node clocks, but are intended to synchronize the audio and video streams for consistent playback. These timestamps will need to be derived from a common clock on the same node at the time of capture. For example, when a video frame is captured, the time when the video frame was captured must be recorded. The same applies to audio. Additional details and guidelines for using RTP are described elsewhere herein.

The function of the main control module 1822 in synchronizing the audio and video is to make the connection between the network entity 1806 and the codecs 1804 in order for proper delivery of the metadata (including timestamps and sequence numbers) and multimedia data. If packets are late, then they can be dropped before or after decoding depending on the current conditions of the system. The RTP timestamps are subsequently used to create the presentation and playback timestamps.

The main control module 1822 is also responsible for directing the output of the audio and video decoders 1890 to the screen for playback, to file for recording, or to both. Each decoder 1890 is treated independently, therefore this allows in an example situation for the output of one decoder to be displayed on the screen, the output of a second decoder to be recorded in a file, and the output from a third decoder to go both to a file and to the screen simultaneously.

In addition to the above-mentioned responsibilities, the main control module 1822 is also involved in application layer quality of service. The main control module 1822 gathers information regarding packet drops, bytes received and sent, and acts accordingly based on this information. This could involve sending a message to another client or to the videoconference server 205 to help remedy a situation that is occurring in the network. Real Time Control Protocol (RTCP) can be used for reporting statistics and packet losses, and can also be used for application specific signaling.

Figure 18B:
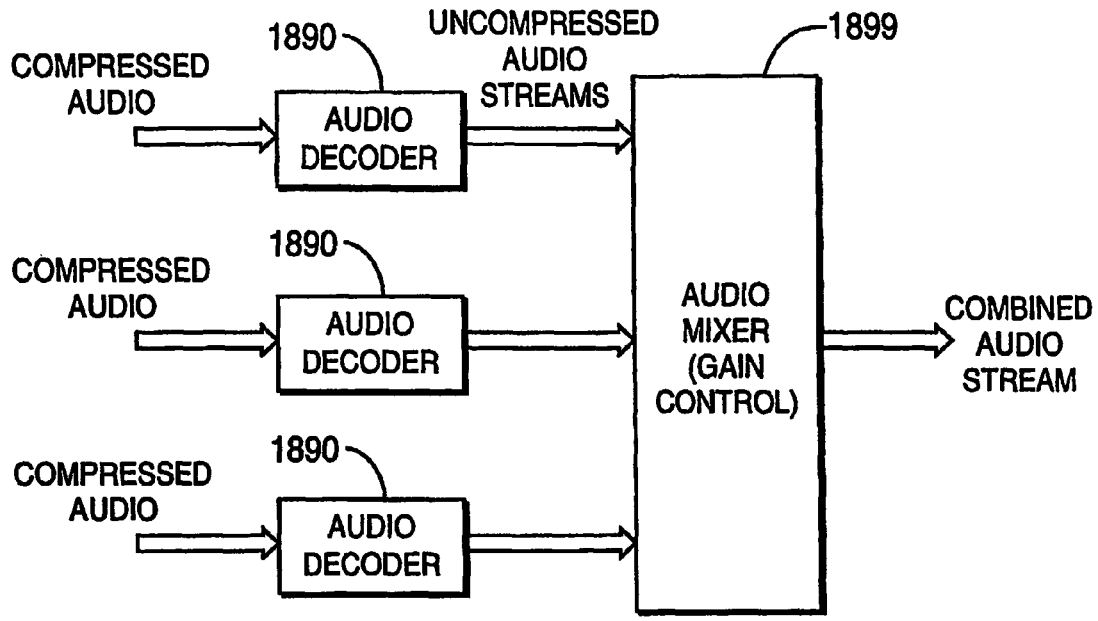
FIG. 18B is a block diagram further illustrating the audio mixer 1899 included in the multimedia interface layer 1802 of FIG. 18A, according to an illustrative embodiment of the present invention.

FIG. 18B is a block diagram further illustrating the audio mixer 1899 included in the multimedia interface layer 1802 of FIG. 18A, according to an illustrative embodiment of the present invention. The audio mixer 1899, also referred to herein as a "gain control module"), is operatively coupled to a plurality of audio decoders 1890. The multiple audio decoders 1880 receive compressed audio streams and output uncompressed audio streams. The uncompressed audio streams are input to the audio mixer 1899 and output as a combined audio stream.

Figure 18C:
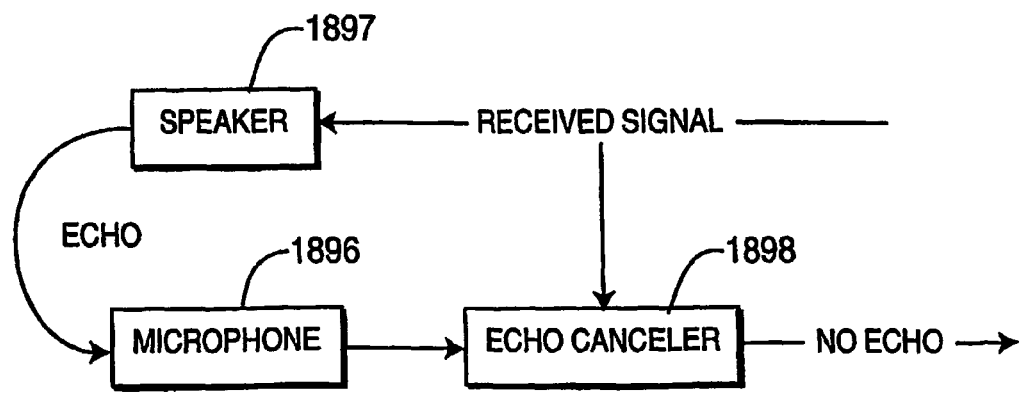
FIG. 18C is a block diagram further illustrating the echo cancellation module 1898 included in the multimedia interface layer 1802 of FIG. 18A, according to an illustrative embodiment of the present invention.

FIG. 18C is a block diagram further illustrating the echo cancellation module 1898 included in the multimedia interface layer 1802 of FIG. 18A, according to an illustrative embodiment of the present invention. The echo cancellation module (also referred to herein as "echo canceller") 1898 is operatively coupled to a speaker 1897 (e.g., audio playback module 1832b) and a microphone 1896 (e.g., microphone interface 1830b). When sound from the speaker 1897 is produced in a full duplex or two-way communication system, it is intended to be heard only from the local listener. However, the produced sound is also heard by the local microphone 1896, which then allows the signal to transmit back to the distant end and is heard as echo. For this reason, the videoconference client application 1800 requires the echo cancellation module 1898 to mitigate this effect, thereby creating a better user experience.

A description will now be given of interfaces available to the sub-systems of the videoconference client application 1800, according to an illustrative embodiment of the present invention. The interfaces include the points of interaction with the user interface 1808, the network entity 1806, and the codecs 1804. The user interface 1808 provides functions for receiving captured audio and video along with their corresponding timestamps. In addition to this, functions must be provided for sending audio and video to the user interface 1808 for display and reproduction. The network entity 1806 interface provides functions for signaling incoming and outgoing messages for session control and security. The audio and video codecs 1804a,b provide a basic interface for configuration control as well as to send and receive packets for compression or decompression.

A description will now be given of the audio and video codecs 1804a,b, according to an illustrative embodiment of the present invention.

There are several audio and video codecs available for use in videoconferencing. Preferably but not necessarily, the codecs employed in accordance with the present invention are software based. According to one illustrative embodiment of the present invention, H.263 is used for video compression and decompression due to the processing power constraints of typical desktop computers. As desktop computers become more powerful in the future, the ability to use a more advanced codec such as H.26L can be realized and taken advantage of. Of course, the present invention is not limited to the preceding types of codecs and, thus, other types of codecs may be used while maintaining the spirit and scope of the present invention.

A description will now be provided of the interface to the codecs 1804a,b, according to an illustrative embodiment of the present invention. The description will encompass a DataIn function, callback functions, and codec options. The interface to the codecs 1804a,b should be flexible enough and defined in a general sense to allow interchangeability of codecs as well as to allow the addition of new codecs in the future. The proposed interface for implementing this flexible and general interface is a very simple interface with a limited number of functions provided to the user.

The DataIn function is simply used to store a frame or a packet of the encoder or decoder class.

In order to provide a simple connection between the multimedia interface layer 1802 and the multimedia codecs 1804, the data output function should be implemented as a callback. The multimedia interface layer 1802 sets this callback function to the input function of the receiving entity. For example, when the codec has completed encoding or decoding a frame, this function will be called by the codec in order to deliver the intended information from the encode or decode process. Due to the constraints that the codec is not able to do anything while in this callback, this function should return as quickly as possible to prevent waiting and unnecessary delays in the system. The only additional wait that should be performed in this function should be a mutex lock when accessing a shared resource.

The range of options available to different types of codecs will vary. In order to satisfy the requirements for managing these options, a simple interface should be used. A text-based interface is preferred (but not mandated) because of the flexibility that it offers. There should be a common set of commands such as START and STOP, and then codec specific commands. This method offers a simple interface, but adds additional complexity to the codec because a simple interpreter is required. As an example, an Options function can be generic enough to read and write options.

Example: Result=Options("start"); Result=Options ("resolution=CIF"); etc.

For example, some of the common options between codecs should be standardized as follows: start; stop; pause; quality index (0-100); and resolution.

The quality index is a factor that describes the overall quality of the codec as a value between 0% and 100%. It follows the basic assumption that the higher the value the better the video quality.

FIG. 19 is a diagram illustrating a method employed by a decoder 1890 included in either of the audio codecs 1804a and/or the video codecs 1804b, according to an illustrative embodiment of the present invention. The method is described with respect to a decoder context 1901 and a caller context 1902. The method operates using at least the following inputs and outputs: "data in" 1999; "signal in" 1998; "signal out callback" 1997; "set callback function" 1996; and "data out callback" 1995. The input "data in" 1999 is used to store data into an input queue (step 1905).

An initialization step (Init) is performed to initialize the decoder 1890 (step 1910). A main loop is executed, that waits for a start or exit command (step 1920). If an exit command is received, then the method is exited (step 1922) and a return is made to, e.g., another operation (1924).

Data is read out of an input queue 1895 or a wait condition is imposed if the input queue 1895 is empty (step 1930). The data, if read out at step 1930, is decoded (step 1940). The "data out callback" 1995 is provided to step 1920.

A description will now be given of the communications employed by the network 200, according to an illustrative embodiment of the present invention. The description supplements that provided above with respect to network communications.

The messaging system 1842 (included in the network entity 1806 of FIG. 18A) provides the interface between the videoconference client application 1800 and the videoconference server 205. It is intended to be used for session management (i.e., session setup and teardown). All signaling messages are communicated through the videoconference server 205 and not directly from client to client. Data such as multimedia content and private chat messages comprise the only information sent directly between clients. The messaging system will use the standards based Session Initiation Protocol (SIP).

There are several different protocols that govern the functionality of the videoconference client application 1800. For example, Session Initiation Protocol (SIP), Real Time Protocol (RTP), Real Time Control Protocol (RTCP), and Session Description Protocol (SDP) may be employed.

The purpose of Session Initiation Protocol (SIP) is session management. SIP is a text based application layer control protocol for creating, modifying and terminating multimedia sessions with one or more participants on IP based networks. SIP is used between the client and the server to accomplish this. SIP is described further above with respect to the videoconference server 205.

Real Time Protocol (RTP) is used for the transmission of real-time multimedia (i.e., audio and video). RTP is an application layer protocol for providing additional details pertaining to the type of multimedia information it is carrying. RTP resides above the transport layer and is usually carried on top of the User Datagram Protocol (UDP). The primary function of RTP in the client application will be for transporting timestamps (for audio and video synchronization), sequence numbers, as well as identify the type of payload it is encapsulating (e.g., MPEG4, H.263, G.723, etc.).

Figure 20:
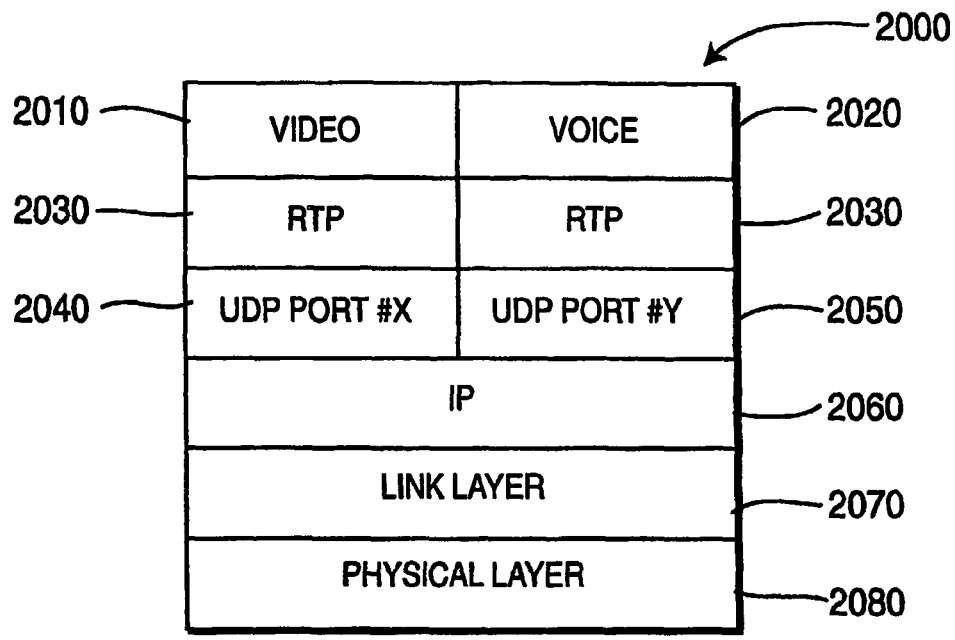
FIG. 20 is a diagram illustrating a user plane protocol stack 2000, according to an illustrative embodiment of the present invention.

FIG. 20 is a diagram illustrating a user plane protocol stack 2000, according to an illustrative embodiment of the present invention. The stack 2000 includes video 2010 and voice 2020 on one layer, RTP 2030 for both video 2010 and voice 2020 on another layer, UDP Port #X 2040 and UDP Port #Y 2050 on yet another layer, an IP layer 2060, a link layer 2070, and a physical layer 2080. Codec specific RTP headers are used in addition to a generic RTP header.

Real Time Control Protocol (RTCP) is part of the RTP standard. RTCP is used as a statistics reporting tool between senders and receivers. Each videoconference client application 1800 will gather their statistics and send them to one another as well as to the server 205. The videoconference server 205 will record information about problems that may have occurred in the session based on this data.

Figure 21:
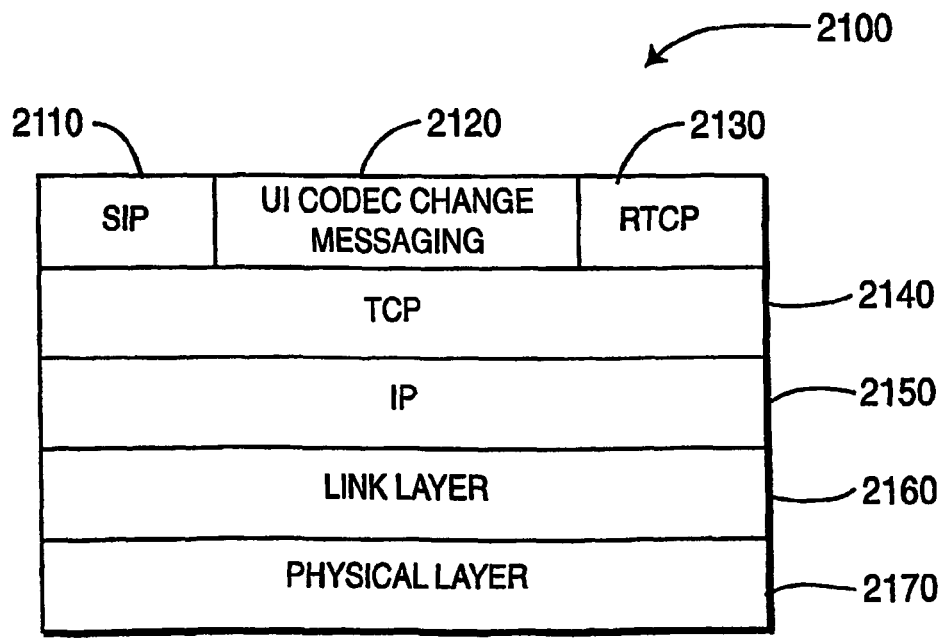
FIG. 21 is a diagram illustrating a control plane protocol stack 2100, according to an illustrative embodiment of the present invention.

FIG. 21 is a diagram illustrating a control plane protocol stack 2100, according to an illustrative embodiment of the present invention. The stack 2100 includes SIP 2110, UI codec change messaging 2120, and RTCP 2130 on one layer, a TCP layer 2140, an IP layer 2150, a link layer 2160, and a physical layer 2170.

The main purpose of SDP is to convey information about media streams of a session. SDP includes, but is not limited to, the following items: session name and purpose; time the session is active; the media comprising the session; information to receive the media (i.e., addresses, ports, formats, etc.); type of media; transport protocol (RTP/UDP/IP); the format of the media (H.263, etc.); multicast; multicast address for the media; transport port for the media; unicast; and remote address for the media.

The SDP information is the message body for a SIP message. They are transmitted together.

A further description will now be given of the user interface 1808 of FIG. 18A, according to an illustrative embodiment of the present invention. The user interface 1808 is a very important element of the videoconference client application 1800. The user interface 1808 includes several views (display/buttons/menus/ . . . ) and can handle all the input data (audio/video capture, buttons, keystrokes).

Figure 22:
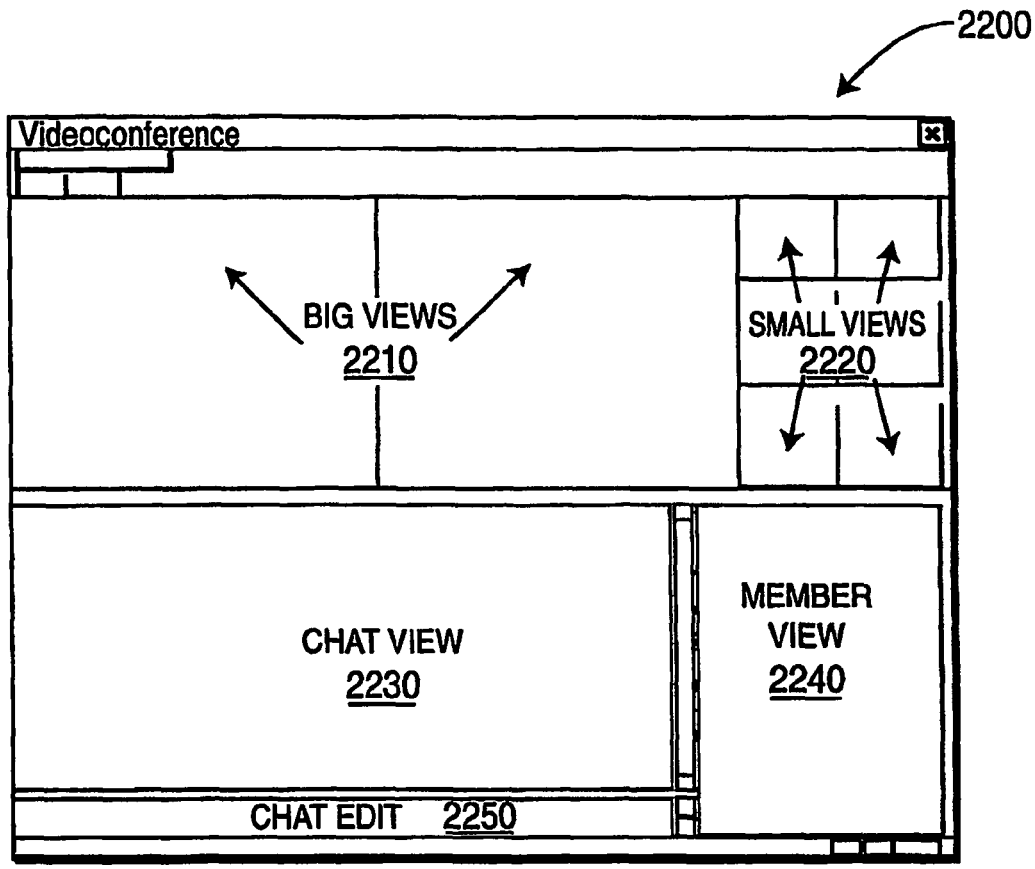
FIG. 22 is a block diagram illustrating a screen shot 2200 corresponding to the user interface 1808 of FIG. 18A, according to an illustrative embodiment of the present invention.

FIG. 22 is a block diagram illustrating a screen shot 2200 corresponding to the user interface 1808 of FIG. 18A, according to an illustrative embodiment of the present invention. The screen shot 2200 includes "big views" 2210, "small views" 2220, a chat view portion 2230, a member view portion 2240, and a chat edit portion 2250.

Referring again to FIG. 18A, the video capture interface 1830 can include any of the following: web cam (not shown); capture card and high quality camera (not shown); camera interface 1830a; microphone interface 1830b; file interface 1830c; and so forth.

The web cam should be supported through either the USB or Firewire (IEEE1394) interface using the Video For Windows (VFW) Application Programming Interface (API) provided by the Windows operating system or through an alternative capture driver used under a different operating system such as Linux. Of course, the present invention is not limited to the preceding interfaces, operating systems, or drivers and, thus, other interfaces, operating systems, and drivers may also be used, while maintaining the spirit and scope of the present invention.

The member view module 1834 is used to show the members participating in the ongoing call. The initiator (i.e., Master) of the call can either drop unwanted members or select active members. Every member can select one or more members for a private chat message exchange. In addition, the status of a member is signaled in the member view module 1834. A member can then set their own status to, e.g., "Unavailable", to signal the other they are currently not available but will be back soon.

In addition to the video stream, every member has the opportunity to send chat messages to either all or only some other members using the chat module 1836. The messages are displayed in the chat view and edited in the chat edit view. A scrollbar allows viewing of older messages.

A description will now be given of operational scenarios for the client application 1800, according to an illustrative embodiment of the present invention. The following description is simply a basic guideline of some of the features of the client application 1800 and is not intended to represent a complete list of features. The description will encompass login, initiation of a call, acceptance of a call, and logoff.

The login is done when the client application 1800 is initially started. The login can be done automatically based on the login name provided to the operating system at startup, or a different interface can be used that is independent of the login. It depends on the preferred method of authentication for the network that is currently used and how policies are administrated. The simplest method would be to use the same login name as that used in the windows operating system to keep naming consistent and also to have the ability to reuse existing user databases (if applicable).

Figure 23:
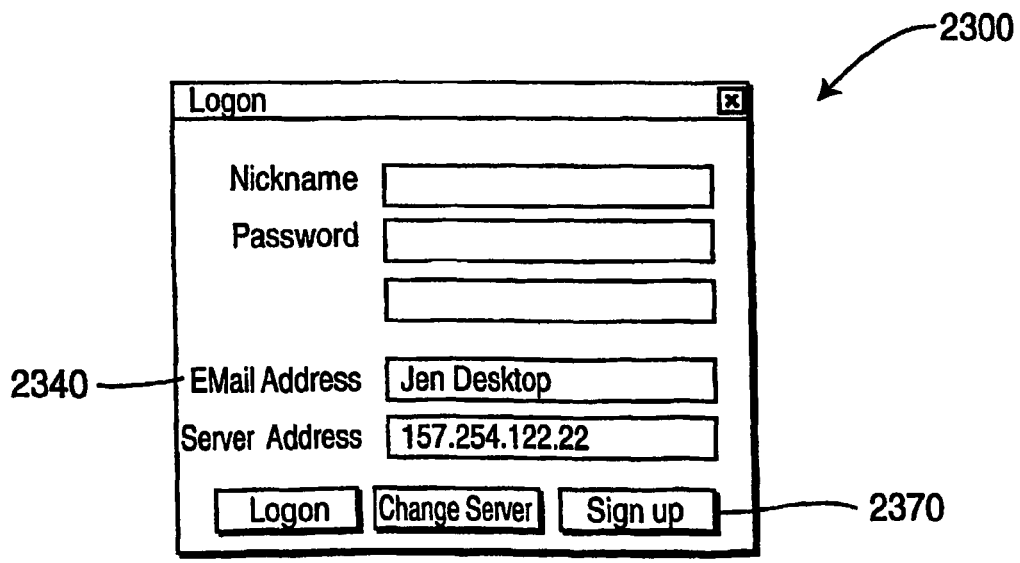
FIG. 23 is a diagram illustrating a login interface 2300, according to an illustrative embodiment of the present invention.

FIG. 23 is a diagram illustrating a login interface 2300, according to an illustrative embodiment of the present invention. The sign up feature 2330 is used if a user does not currently have an account on the server. Email addresses can be provided in any e-mail address input box 2340 for easy access.

To initiate a call, the client application 1800 will query the server 205 for a list of available candidates. The client can select the users he or she wishes to engage in a videoconference session. A session will be setup as unicast when two participants are involved; otherwise, when more than two participants are involved the session is set up as a multicast session.

Figure 24:
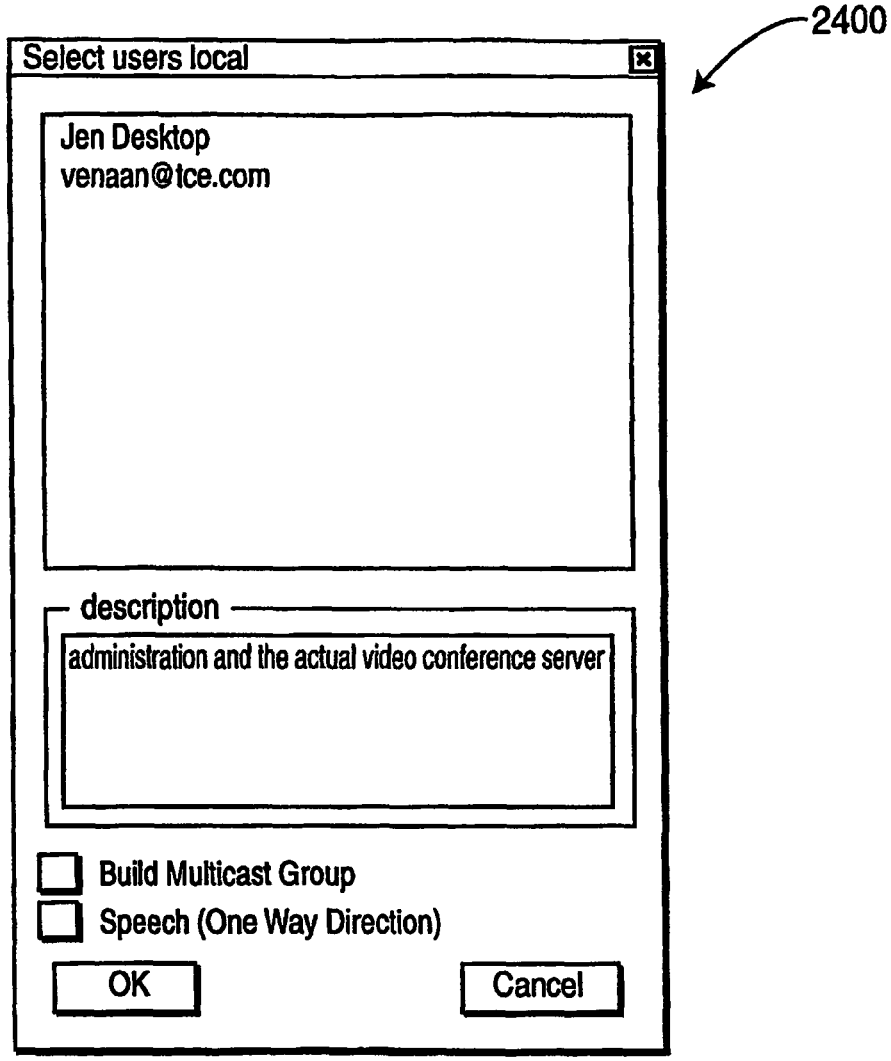
FIG. 24 is a block diagram illustrating a user selection interface 2400 for session initiation, according to an illustrative embodiment of the present invention.

FIG. 24 is a block diagram illustrating a user selection interface 2400 for session initiation, according to an illustrative embodiment of the present invention.

Figure 25:
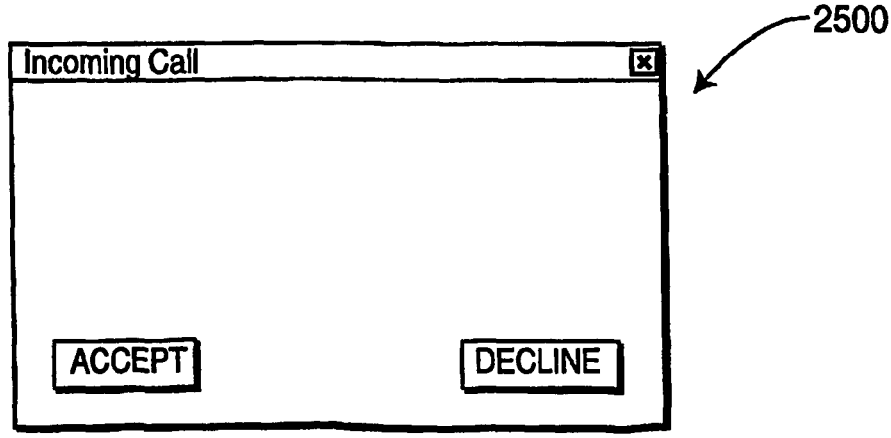
FIG. 25 is a block diagram illustrating an invitation interface 2500 for accepting or rejecting an incoming call, according to an illustrative embodiment of the present invention.

Once the user is invited to a call, a message showing the name of the initiator is displayed on their screen. The user can then either accept or reject the call. If the user accepts the call, then the client application 1800 sends an accept (or acknowledgement) message to the server 205. The server 205 then informs every member currently participating in the call about the new member. If the user declines the call by sending the cancellation message to the server 205, then all other members are also informed about that event. FIG. 25 is a block diagram illustrating an invitation interface 2500 for accepting or rejecting an incoming call, according to an illustrative embodiment of the present invention.

The logoff will remove the user from the member database 314 included in the database entity 302 of the videoconference server 205. A BYE message is sent to each participating client of the session. This can be done either through multicast or unicast. Multicast is the preferred method for sending this message.

For illustrative purposes, the following description of the present invention is made with respect to the illustrative network 200 shown in FIG. 2. However, it is to be appreciated that the present invention is not limited to the specific network configuration shown in FIG. 2 and, thus, other configurations and implementations of a network may also be employed in accordance with the present invention while maintaining the spirit and scope of the present invention.

The differentiating of the types of traffic (real-time traffic and non-real-time traffic) across the network 200 can be done at the routers 240, 245 that interface the LANs 225, 235 to the WAN 250. Inside these routers 240, 245, a filter can exist that has certain criteria such as a source and destination Internet Protocol (IP) address, User Datagram Protocol/Transmission Control Protocol (UDP/TCP) port numbers, and so forth that can be used to provide a basis for differentiating the traffic. The present invention provides a mechanism to dynamically set up these traffic classification filters based on a videoconference time reservation system.

In a videoconference system, a time reservation system is typically employed to reserve time periods for using the videoconference system. However, in addition to employing the time reservation system to reserve time periods for using the videoconference system, a videoconference system according to the present invention advantageously creates a Quality of Service contract and also provides filter criteria (e.g., the specific members of the video conference) for the duration of the videoconference session. The QoS contract and the traffic classification filter will not be entered Into the routers 240, 245 that connect the two LANs 225, 235 together across the WAN 250 until the reserved time period has been reached. Once the reserved time period is over, the QoS contract and filter will be removed from the routers 240, 245 that connect the two LANs 225, 235 together across the WAN 250. For example, if a videoconference session is reserved between 1:00 PM and 2:00 PM on a certain day, the videoconference server 205 will dynamically set up the QoS contract and filter for this specified amount of time to provide proper support for the videoconference session between the two clients over the WAN 250.

The routers 225, 235 provide the entry point to the WAN 250 and, according to an illustrative embodiment of the present invention, this is where the QoS contract and filter are applied. This allows the routers 225, 235 to be able to properly treat the video traffic when entering the WAN 250. The video traffic will get the amount of bandwidth it requires to be sent across the WAN 250, and then any remaining unused bandwidth will be allocated to best effort data services.

Figure 26:
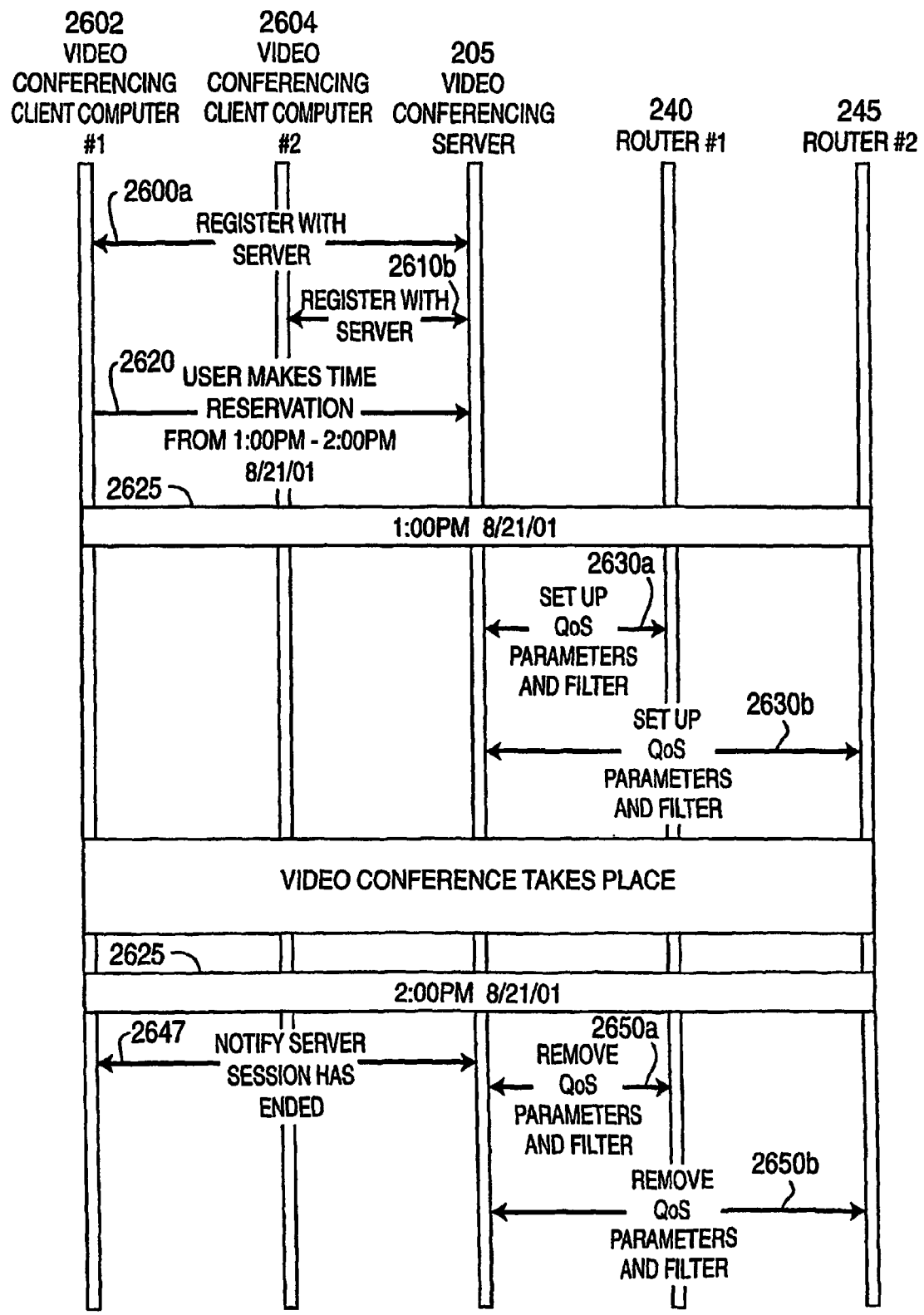
FIG. 26 is a flow diagram illustrating a method for setting up a Quality of Service (QoS) contract and traffic classification filter for a videoconference session, according to an illustrative embodiment of the present invention.

FIG. 26 is a flow diagram illustrating a method for setting up a Quality of Service (QoS) contract and traffic classification filter for a videoconference session, according to an illustrative embodiment of the present invention. The method is based on a time reservation for the videoconference session. The method involves a videoconferencing client computer #1 (client computer #1) 2602, a videoconferencing client computer #2 (client computer #2) 2604, a videoconference server 205, a router #1 240, and a router #2 245. In the example, the user of client computer #1 is the initiating client of the videoconference session.

Client computer #1 2602 and client computer #2 2604 initially register with the videoconference server 205 (steps 2610a and 2610b). Steps 2610a, 2610b may be performed when the computers 2602, 2604 are initially powered up or at some other time. The information provided during registration includes the IP address of client computer #1 2602 and client computer #2 2604. Each of the IP addresses may be associated with a location name or a computer name that somehow uniquely identifies the corresponding client computer; of course, the association may be omitted and the IP addresses used as is, since the IP addresses do in fact uniquely identify the computers although perhaps in not the most user friendly format.

A user of client computer #1 2602 reserves a time period and a date for the videoconference session (step 2620). Upon the arrival of the reserved time period and date (2625), configuration information is sent from the videoconference server 205 to each of the routers 240, 245 (steps 2630a and 2630b). The configuration information can be sent to the routers 240, 245 using, e.g., Simple Network Management Protocol (SNMP). Of course, the present invention is not limited to SNMP and, thus, other protocols may also be employed while maintaining the spirit and scope of the present invention. The configuration information includes the QoS contract and the traffic classification filter. The QoS contract specifies the average amount of bandwidth required by the videoconference session traffic. The traffic classification filter specifies the source IP address and the destination IP address, and it also specifies some specific UDP ports for real-time traffic. The traffic classification filter can also be as simple as a Type of Service (ToS) field bit set in the IP header. It is to be appreciated that the present invention is not limited to the preceding types of traffic classification filters and, thus, other types of traffic classification filters may be employed. That is, given the teachings of the present invention provided herein, one of ordinary skill in the related art will contemplate these and various other types of traffic classification filters and information corresponding thereto, while maintaining the spirit and scope of the present invention.

The videoconference session is conducted in accordance with the QoS contract, using the traffic classification filter to provide a guaranteed amount of bandwidth for the videoconference session (step 2640).

Upon the expiration of the reserved time period and date (step 2645), each of the routers 240, 245 is contacted by the videoconference server 205 to remove the configuration information previously sent thereto (step 2650a 2650b).

Alternatively, instead of removing the configuration information as soon as the time period has expired (per step 2650), the videoconference application governing the videoconference session can notify the videoconference server 205 when the videoconference session has finished (step 2647). Then, subsequent to step 2647, step 2650 is performed so that each of the routers 240, 245 is contacted by the videoconference server 205 to remove the configuration information. This alternative can provide greater flexibility in the length of the videoconference session.

It is to be appreciated that while the method of FIG. 26 is described with respect to a single traffic classification filter for the videoconference session, more than one traffic classification filter can be used for a videoconference session. For example, one filter may be used to classify/differentiate real-time traffic and another filter may be used to classify/differentiate non-real-time traffic. Moreover, while the method of FIG. 26 is described with respect to routers, other routing elements of a network may also be used and thus, the present invention is not limited to simply routers. Given the teachings of the present invention provided herein, one of ordinary skill in the related art will contemplate these and various other configurations and implementations of the present invention, while maintaining the spirit and scope of the present invention.

Although the illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

The invention claimed is:

1. In a network having routing elements for routing information through the network, a method for setting up a Quality of Service (QoS) contract for a session between clients, the method comprising the steps of:
   receiving a reservation for a future time period for the session;
   sending configuration information including clients participating in the session, source and destination IP address, client capabilities, information about particular codecs, and status details of clients, to at least one of the routing elements only when the reserved time period has been reached for filtering real-time traffic corresponding to the session from other non-real-time traffic traversing the network during the session; and
   contacting the at least one of the routing elements to remove the configuration information upon an expiration of the session, regardless of whether said expiration of the session occurs before or after the end of the reserved time period.

2. The method of claim 1, further comprising the step of registering the clients for the session.

3. The method of claim 2, wherein said registering step comprises the step of receiving Internet Protocol (IP) addresses of each of the clients.

4. The method of claim 3, wherein said registering step further comprises the step of respectively associating the IP addresses of each of the clients with a unique identifier.

5. The method of claim 1, wherein the configuration information is sent using Simple Network Management Protocol (SNMP).

6. The method of claim 1, wherein the QoS contract specifies the average amount of bandwidth required by session traffic.

7. The method of claim 1, wherein the configuration information specifies a source Internet Protocol (IP) address and a destination IP address.

8. The method of claim 7, wherein the configuration information further specifies specific User Datagram Protocol (UDP) ports for the real-time traffic.

9. The method of claim 1, wherein the configuration information is a Type of Service (ToS) field bit set in an Internet Protocol (IP) header of an IP packet.

10. The method of step 1, wherein the step of contacting the at least one of the routing elements to remove the configuration information is performed upon an expiration of the reserved time period.

11. The method of claim 1, further comprising the steps of:
    receiving a notification when the session has completed; and
    wherein said contacting is performed upon receipt of said notification.

12. In a network having routing elements for routing information through the network, a system for setting up a Quality of Service (QoS) contract for a session between clients, the system comprising:
    means for receiving a reservation for a future time period for the session;
    means for sending configuration information including clients participating in the session, source and destination IP address, client capabilities, information about particular codecs, and status details of clients to at least one of the routing elements only when the reserved time period has been reached for filtering real-time traffic corresponding to the session from other non-real-time traffic traversing the network during the session; and
    means for contacting the at least one of the routing elements to remove the configuration information upon an expiration of the session, regardless of whether said expiration of the session occurs before or after the end of the reserved time period.

13. The system of claim 12, further comprising means for registering the clients for the session.

14. The system of claim 13, wherein said means for registering comprises means for receiving Internet Protocol (IP) addresses of each of the clients.

15. The system of claim 14, wherein said means for registering further comprises means for respectively associating the IP addresses of each of the clients with a unique identifier.

16. The system of claim 12, wherein the configuration information is sent using Simple Network Management Protocol (SNMP).

17. The system of claim 12, wherein the QoS contract specifies the average amount of bandwidth required by session traffic.

18. The system of claim 12, wherein the configuration information specifies a source Internet Protocol (IP) address and a destination IP address.

19. The system of claim 18, wherein the configuration information further specifies specific User Datagram Protocol (UDP) for the real-time traffic.

20. The system of claim 12, wherein the configuration information is a Type of Service (ToS) field bit set in an Internet Protocol) IP header of an IP packet.

21. The system of step 12, wherein said means for contacting the at least one of the routing elements operates to remove the configuration information upon an expiration of the reserved time period.

22. The system of claim 12, further comprising:
means for receiving a notification when the session has completed; and
wherein said means for contacting the at least one of the routing elements to remove the configuration information operates to contact the at least one routing element upon receipt of said notification.

23. In a network having routing elements for routing information through the network, a method for setting up a Quality of Service (QoS) contract for a session between clients, the method comprising the step of:
sending a reservation for the session, the reservation specifying a future time period for the session so that a client may participate in the session with a guaranteed level of service during the specified time period, said reservation reserving the routing elements and causing the routing elements to receive configuration information only when the reserved time period has been reached, the configuration information including clients participating in the session, source and destination IP address, client capabilities, information about particular codecs, and status details of clients; and
sending a notification of when the session has ended, regardless of whether said expiration of the session occurs before or after the end of the reserved time period.

24. The method of claim 23, further comprising the step of providing, to at least one of the clients, the ability to register for the session.

25. The method of claim 24, wherein said step of providing further comprises the step of sending an Internet Protocol (IP) address.

26. The method of claim 1, wherein the session comprises a videoconference session.

27. The system of claim 12 wherein the session comprises a videoconference session.

28. The method of claim 23 wherein the session comprises a videoconference session.

29. In a network having routing elements for routing information through the network, a system for setting up a Quality of Service (QoS) contract for a session between clients, the system comprising:
a server for receiving a reservation for a future time period for the session; for sending configuration information including clients participating in the session, source and destination IP address, client capabilities, information about particular codecs, and status details of clients to at least one of the routing elements only when the reserved time period has been reached for filtering real-time traffic corresponding to the session from other non-real-time traffic traversing the network during the session; and for contacting the at least one of the routing elements to remove the configuration information upon an expiration of the session, regardless of whether said expiration of the session occurs before or after the end of the reserved time period.

30. The system of claim 29, wherein the server registers the clients for the session.

31. The system of claim 30, wherein the server registers the clients by receiving Internet Protocol (IP) addresses of each of the clients.

32. The system of claim 31, wherein the server respectively associates the IP addresses of each of the clients with a unique identifier.

33. The system of claim 29, wherein the configuration information is sent by the server using Simple Network Management Protocol (SNMP).

34. The system of claim 29, wherein the QoS contract specifies the average amount of bandwidth required by session traffic.

35. The system of claim 29, wherein the configuration information specifies a source Internet Protocol (IP) address and a destination IP address.

36. The system of claim 35, wherein the configuration information further specifies specific User Datagram Protocol (UDP) for the real-time traffic.

37. The system of claim 29, wherein the configuration information is a Type of Service (ToS) field bit set in an Internet Protocol (IP) header of an IP packet.

38. The system of step 29, wherein contacting the at least one of the routing elements operates to remove the configuration information upon an expiration of the reserved time period.

39. The system of claim 29, wherein the server receives a notification when the session has completed and contacts the at least one of the routing elements to remove the configuration information.

* * * * *